US010454931B2

(12) United States Patent
Hinaman et al.

(10) Patent No.: US 10,454,931 B2
(45) Date of Patent: Oct. 22, 2019

(54) SECURE REMOTE ACCESS FOR SECURED ENTERPRISE COMMUNICATIONS

(71) Applicants: Ted Hinaman, Malvern, PA (US); Steven J Rajcan, Malvern, PA (US); Matthew Mohr, Malvern, PA (US); William Gunn, Malvern, PA (US); Sarah K Inforzato, Malvern, PA (US); Robert A Johnson, Malvern, PA (US); Gregory J Small, Malvern, PA (US); David S Dodgson, Malvern, PA (US)

(72) Inventors: Ted Hinaman, Malvern, PA (US); Steven J Rajcan, Malvern, PA (US); Matthew Mohr, Malvern, PA (US); William Gunn, Malvern, PA (US); Sarah K Inforzato, Malvern, PA (US); Robert A Johnson, Malvern, PA (US); Gregory J Small, Malvern, PA (US); David S Dodgson, Malvern, PA (US)

(73) Assignee: UNISYS CORPORATION, Blue Bell, PA (US)

(*) Notice: Subject to any disclaimer, the term of this patent is extended or adjusted under 35 U.S.C. 154(b) by 266 days.

(21) Appl. No.: 15/001,354

(22) Filed: Jan. 20, 2016

(65) Prior Publication Data
US 2017/0208038 A1 Jul. 20, 2017

(51) Int. Cl.
H04L 29/06 (2006.01)
H04W 12/06 (2009.01)
(Continued)

(52) U.S. Cl.
CPC ...... H04L 63/0884 (2013.01); H04L 12/4641 (2013.01); H04L 63/029 (2013.01);
(Continued)

(58) Field of Classification Search
CPC . H04L 63/0884; H04L 63/104; H04L 63/029; H04L 63/083; H04L 12/4641; H04W 12/06; H04W 72/04; H04W 88/16
(Continued)

(56) References Cited

U.S. PATENT DOCUMENTS

2002/0188706 A1* 12/2002 Richards ............... H04L 29/06
709/223
2004/0143730 A1* 7/2004 Wen .................... G06Q 20/3674
713/150
2004/0193943 A1* 9/2004 Angelino ............ H04L 63/1408
714/4.1

* cited by examiner

Primary Examiner — Ashokkumar B Patel
Assistant Examiner — William B Jones

(57) ABSTRACT

Methods and systems for securing communications with an enterprise from a remote computing system are disclosed. One method includes initiating a secured connection with a VPN appliance associated with an enterprise using service credentials maintained in a secure applet installed on a remote computing device, and initiating communication with an authentication server within an enterprise via the secured connection. The method also includes receiving specific credentials from the authentication server, terminating the secured connection with the VPN appliance, and initiating a second secured connection with the VPN appliance using the specific credentials, the specific credentials providing access to one or more computing devices within the enterprise being within a same community of interest as the remote computing device and obfuscating one or more other computing systems within the enterprise excluded from the community of interest. The method also includes initiating communications with at least one of the one or more computing devices included in the community of interest.

22 Claims, 16 Drawing Sheets

(51) Int. Cl.
  *H04L 12/46* (2006.01)
  *H04W 72/04* (2009.01)
  *H04W 88/16* (2009.01)

(52) U.S. Cl.
  CPC ........ *H04L 63/0272* (2013.01); *H04L 63/083* (2013.01); *H04L 63/104* (2013.01); *H04W 12/06* (2013.01); *H04W 72/04* (2013.01); *H04W 88/16* (2013.01)

(58) Field of Classification Search
  USPC .......................................................... 726/4
  See application file for complete search history.

SECURE REMOTE ACCESS FOR SECURED ENTERPRISE COMMUNICATIONS

CROSS-REFERENCE TO RELATED APPLICATIONS

The present application claims priority from U.S. Provisional Patent Application 62/095,412 filed on Dec. 22, 2014, the disclosure of which is hereby incorporated by reference in its entirety.

The present application is also related to, and claims priority from the following related and commonly assigned U.S. patent applications:

1. U.S. Provisional patent application entitled: Distributed Security on Multiple Independent Networks using Secure "Parsing" Technology, by Robert Johnson, Ser. No. 60/648,531, filed 31 Jan. 2005;

2. U.S. patent application entitled: Integrated Multi-Level Security System, by Robert Johnson. Ser. No. 11/339,974 filed 26 Jan. 2006 claiming the benefit of the above provisional applications;

3. U.S. patent application entitled: Integrated Multi-Level Security System, by Robert Johnson et al., Ser. No. 11/714,590 filed 6 Mar. 2007 which is a continuation-in-part of U.S. application Ser. No. 11/339,974:

4. U.S. patent application entitled: Integrated Multi-Level Security System, by Robert Johnson et al. Ser. No. 11/714,666 filed 6 Mar. 2007 which is a continuation-in-part of U.S. application Ser. No. 11/339,974; and 5. U.S. patent application entitled: Integrated Multi-Level Security System, by Robert Johnson et al., Ser. No. 11/714,598 filed 6 Mar. 2007 which is a continuation-in-part of U.S. application Ser. No. 11/339,974.

6. U.S. patent application Ser. No. 12/272,012, entitled "Block Level Data Storage Security System", filed 17 Nov. 2008. The present disclosure also claims the benefit of commonly assigned U.S. patent application Ser. No. 12/336,558, entitled "Data Recovery Using Error Strip Identifiers", filed 17 Dec. 2008.

7. U.S. patent application Ser. No. 12/336,559 entitled "Storage Security Using Cryptographic Splitting", filed 17 Dec. 2008, U.S. patent application Ser. No. 12/336,562, entitled "Storage Security Using Cryptographic Splitting", filed 17 Dec. 2008, U.S. patent application Ser. No. 12/336,564, entitled "Storage Security Using Cryptographic Splitting", filed 17 Dec. 2008; and U.S. patent application Ser. No. 12/336,568, entitled "Storage Security Using Cryptographic Splitting", filed 17 Dec. 2008.

8. U.S. patent application Ser. No. 12/342,636 entitled "Storage Communities Of Interest Using Cryptographic Splitting", filed 23 Dec. 2008. U.S. patent application Ser. No. 12/342,575, entitled "Storage Communities Of Interest Using Cryptographic Splitting", filed 23 Dec. 2008, U.S. patent application Ser. No. 12/342,610, entitled "Storage Communities Of Interest Using Cryptographic Splitting", filed 23 Dec. 2008.

9. U.S. patent application Ser. No. 12/342,379, entitled "Secure Network Attached Storage Device Using Cryptographic Splitting", filed 23 Dec. 2008.

10. U.S. patent application Ser. No. 13/493,023, entitled "Software Handling Of Hardware Error Handling In Hypervisor-Based Systems", filed 5 Sep. 2012.

11. U.S. patent application Ser. No. 13/547,148, entitled "Automated Provisioning of Virtual Machines", filed 12 Jul. 2012.

12. U.S. patent application Ser. No. 14/042,239, entitled "Negotiation of Security Protocols and Protocol Attributes in Secure Communications Environment", filed 30 Sep. 2013.

13. U.S. patent application Ser. No. 14/042,182, entitled "Secured Communications Arrangement Applying Internet Protocol Security", filed 30 Sep. 2013.

The disclosures of each of these applications are hereby incorporated by reference in its entirety as if set forth in this application.

TECHNICAL FIELD

The present application relates generally to secured communications and storage systems, and in particular to secured remote access to an enterprise having internal secured communications.

BACKGROUND

Modern organizations generate store, and communicate large quantities of data. In many instances, organizations include individuals having different rights to data, or different rights to communicate with other individuals or access particular computing resources. It is frequently important that such organizations be able to quickly and securely access the data stored at the data storage system. In addition, it is frequently important that data stored at a data storage system, or communicated between computing systems, be recoverable if the data is communicated or written incorrectly or are otherwise intercepted or corrupted.

To address the above issues, Unisys Corporation of Blue Bell, Pa. developed a Stealth solution that uses a kernel-level driver to implement end-to-end cryptographic connections for communication of data across public and private networks. This solution allows users to communicate with other users having common user rights, while segregating user groups by way of assignment of different cryptographic keys used for each user group, or "community of interest". However, the Stealth solution has some drawbacks. First, the existing Stealth solution is only compatible with IPv4 networks; with the increasing proliferation of IPv6 addressing, some migration is needed. Secondly, the existing Stealth solution resides primarily in drivers at the kernel level, and as such is specifically tailored for use on specific operating systems (e.g., Windows-based systems); an incompatible computing system is typically placed behind a Stealth-enabled appliance that can be used to route communications on the behalf of that incompatible computing system. Furthermore, since the existing Stealth solution utilizes a proprietary cryptographic library, it is less trusted by large corporations and governments, who prefer standards-based security systems.

Internet Protocol Security (IPsec) is one such standards-based protocol suite used for securing Internet Protocol (IP) communications by authenticating and encrypting each IP packet of a communication session. IPsec includes protocols for establishing authentication between agents at the beginning of the session and negotiation of cryptographic keys to be used during the session. IPsec is an end-to-end security scheme of the Internet Protocol Suite. As compared to other security systems, such as SSL, SSH, or TLS, IPsec operates in the Internet Layer rather than operating in the upper layers of the TCP/IP model. Hence, IPsec protects any application traffic across an Internet Protocol (IP) network. Applications do not need to be specifically designed to use IPsec, whereas TLS/SSL is required to be designed into an application to protect the application protocols. In addition, IPsec operates in both IPv4 and IPv6-enabled networks.

However, IPsec is not without drawbacks. Existing IPsec-enabled systems typically negotiate to create IPsec tunnels, or secure tunnels, on a point-to-point basis, rather than allowing for data access by multiple entities within the same "community of interest". Furthermore, IPsec is only available on modern computing systems. In Windows environments, IPsec is only available as part the native operating system since the release of Windows 7: prior versions lack support for this security protocol suite. Furthermore, different implementations of IPsec on different types of computing systems are handled differently, leading to inconsistencies in connection parameters. Additionally, IPsec is built based on a premise that two computing systems can negotiate security parameters; when two such systems intend to form a secure tunnel, that tunnel is established through use of an IKE key exchange, which requires a response to an initial transmission. However, to accomplish perfect forward secrecy, such trading of security parameters may not be possible.

Such drawbacks are exacerbated when considered in the context of remote connectivity to an enterprise seeking an end-to-end secured communications solution. Such remote computing systems that require secured communications with enterprise computing systems generally can be temporary or permanently located in specific external locations on a network, and may have different types of software installed thereon, including either dedicated enterprise software, or some combination of data requiring security and public domain data. Accordingly, improvements in the various existing secured communications systems to accommodate such systems are desired.

SUMMARY

The present application relates generally to secured communications and storage systems, and in particular to secured remote access to an enterprise having internal secured communications. In example embodiments, such secured remote access can be used in the context of a virtual gateway, such as in the context of a bring your own device arrangement, an isolated endpoint, a remote cloud or local environment, a mobile device, a roaming workstation or office server, or a secure remote device, such as an automated teller machine (ATM) or kiosk device.

In a first aspect, a method for securing communications with an enterprise from a remote computing system is disclosed. The method includes initiating a secured connection with a VPN appliance associated with an enterprise using service credentials maintained in a secure applet installed on a remote computing device, and initiating communication with an authentication server within an enterprise via the secured connection. The method also includes receiving specific credentials from the authentication server, terminating the secured connection with the VPN appliance, and initiating a second secured connection with the VPN appliance using the specific credentials, the specific credentials providing access to one or more computing devices within the enterprise being within a same community of interest as the remote computing device and obfuscating one or more other computing systems within the enterprise excluded from the community of interest. The method also includes initiating communications with at least one of the one or more computing devices included in the community of interest.

In a second aspect, a computer-implemented method of securing communications between a remote computing device and an enterprise is disclosed. The method includes receiving a request for a secured connection from a remote device at a secure remote access gateway device. The method also includes starting a service virtual data relay useable by the remote device to communicate with an authentication server within the enterprise. The method further includes accepting the request for the secured connection at the secure remote access gateway device, thereby establishing a VPN connection between a VPN appliance associated with the secure remote access gateway device and the remote device. The method includes receiving a request from the remote device to terminate the secured connection, and terminating the service virtual data relay. The method includes receiving a request from the remote device to initiate a second secured connection from the remote device at the secure remote access gateway device using specific credentials, the specific credentials providing access to one or more computing devices within the enterprise being within a same community of interest as the remote computing device and obfuscating one or more other computing systems within the enterprise excluded from the community of interest. The method includes starting a device-specific virtual data relay useable by the remote computing device to communicate with the one or more computing systems within the enterprise, and accepting the request for the second secured connection, thereby allowing the remote computing device to initiate communications with at least one of the one or more computing devices included in the community of interest.

In a third aspect, a system enabling secured communications with an enterprise is disclosed. The system includes a secure remote access gateway device operable as an intermediary between a remote device and one or more computing devices within an enterprise. The secure remote access gateway device is configured to execute program instructions to receive a request for a secured connection from a remote device, and start a service virtual data relay useable by the remote device to communicate with an authentication server within the enterprise. The device further is configured to accept the request for the secured connection at the secure remote access gateway device, thereby establishing a VPN connection between a VPN appliance associated with the secure remote access gateway device and the remote device, and receive a request from the remote device to terminate the secured connection. The device is also configured to terminate the service virtual data relay, and receive a request from the remote device to initiate a second secured connection from the remote device at the secure remote access gateway device using specific credentials, the specific credentials providing access to one or more computing devices within the enterprise being within a same community of interest as the remote computing device and obfuscating one or more other computing systems within the enterprise excluded from the community of interest. The device is configured to start a device-specific virtual data relay useable by the remote computing device to communicate with the one or more computing systems within the enterprise, and accept the request for the second secured connection, thereby allowing the remote computing device to initiate communications with at least one of the one or more computing devices included in the community of interest.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
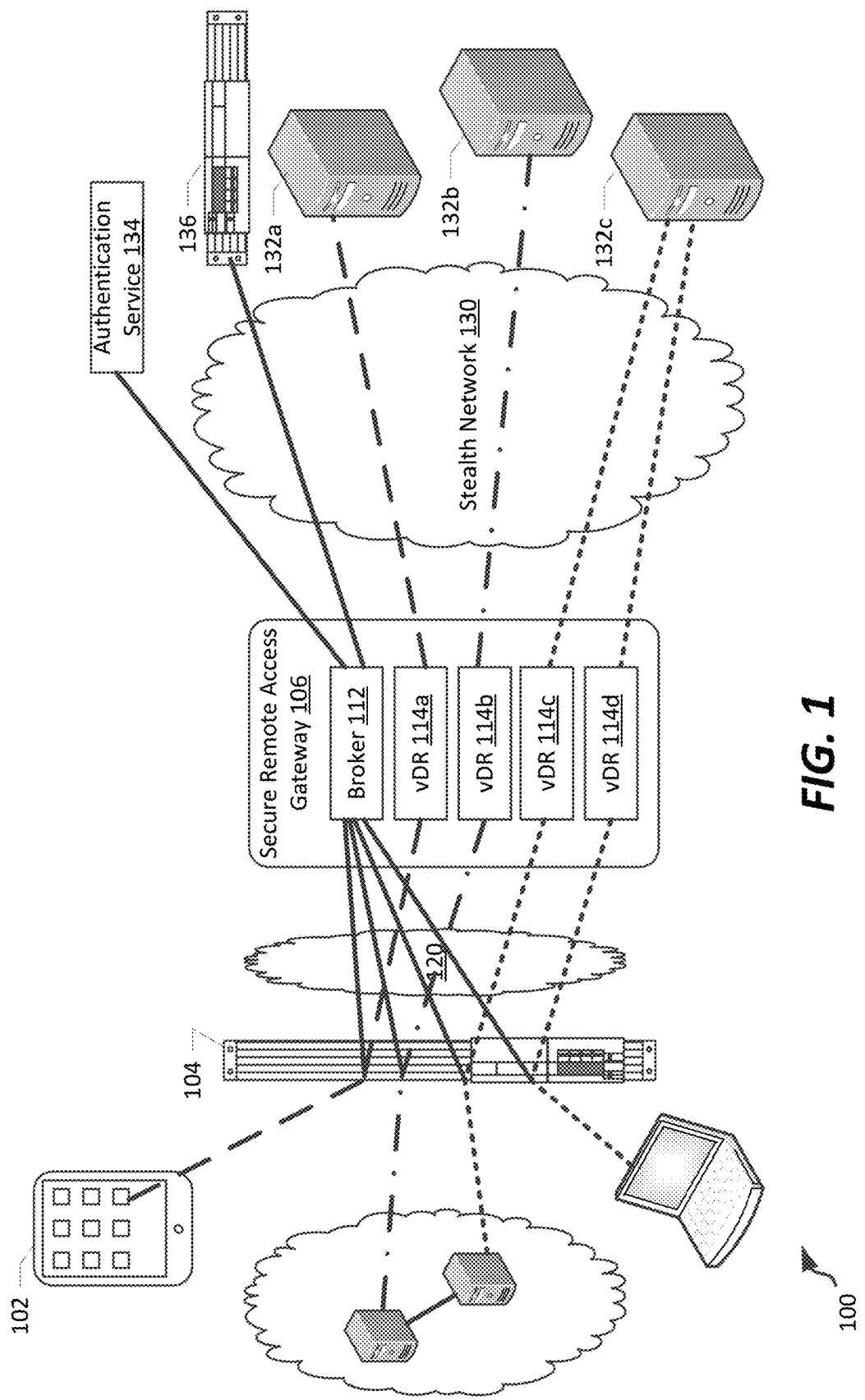
FIG. 1 illustrates an example network in which secured remote communications can be implemented, according to the methods and systems described herein.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

In general, the present disclosure relates to improvements to systems and methods for secured communications with remote devices, such as the Stealth secure communications and storage system of Unisys Corporation of Blue Bell, Pa. As is included in the existing Stealth system, data to be transmitted among endpoints (e.g., client or server computing systems) is encrypted such that (1) no computing system other than the sender and intended recipient can view the contents of the encrypted message(s), and (2) in some embodiments, the messages are configurable such that message packets themselves are split among different packets and optionally transmitted along different transmission paths between computing systems, to ensure receipt of the secured communications at a receiving endpoint. That receiving endpoint can then reconstruct the message based on one or more such received split and encrypted messages.

The present disclosure specifically describes aspects of secure communications and secure computing systems that provide for a flexible manner in which remote devices of various types can connect to a secured network, such as a network secured with Stealth technology. Such remote devices can connect to and securely communicate with endpoints within that secured network. Furthermore, the present application describes connectivity methods and systems by which specific devices, users, or applications themselves may be specifically associated with a group of affiliated computing resources such that only those resources within the secured network are visible to that associated device, user, or application. Other endpoints or computing resources within the secured network remain present, but are entirely opaque to the mobile device if not within the same community of interest. Accordingly, even specifically-addressed messages directed to such endpoints will not be responded to (even with a response denying connection) thereby avoiding potential security issues that may be caused by denial of service attacks or other potential security compromise situations that do not require establishment of a connection to interfere with network operations. Accordingly, the present disclosure provides an additional layer of security in addition to traditional VPN connectivity, which is traditionally controlled or secured only at the level of user/device, and provides for connectivity scenarios associated with remote endpoints of varying trust levels, such as remote mobile devices, remote servers, remote workstation endpoints (static and mobile), and other such scenarios.

In example embodiments, such secured remote access can be used in the context of a virtual gateway, such as in the context of a bring your own device arrangement, an isolated endpoint, a remote cloud or local environment, a mobile device, a roaming workstation or office server, or a secure remote device, such as an automated teller machine (ATM) or kiosk device.

Referring now to FIG. 1, a network 100 in which communication is enabled between one or more remote endpoints and secured endpoints included within a secured network (e.g., an enterprise) is shown. The network 100 includes a plurality of remote devices 102, such as a remote mobile device 102a, a remote laptop 102b, and a plurality of remote office devices at a remote office 103, such as remote servers 102*c-d*. A VPN server 104 allows for communication via a trusted subnet 120 to a secure remote access gateway 106.

In example embodiments, the VPN server 104 connects to an external network which is also accessible by the remote devices 102. The VPN server 104 authenticates and establishes an IPsec tunnel between itself and the respective remote device 102, assigning it an IP address and subsequently routing traffic to the trusted subnet 120.

The secure remote access gateway 106 generally receives messages from the VPN server 104, relayed from the remote computing device 102, via a portion of the enterprise network shown as a trusted subnet 120, which is dedicated to secure message routing between one or more VPN servers 104 and secure remote access gateways 106. The trusted subnet 120 may pass messages in cleartext or encrypted form, but in a manner dedicated to such interface communications with devices located remotely from the enterprise. In example embodiments, the trusted subnet may be a physical network connecting devices or a virtual network connecting software within an OS instance or a combination of the two. In all cases the trusted subnet 120 is isolated from the outside network and the Stealth network 130. Accordingly, if so desired, the trusted subnet 120 can be clear-text and would support packet inspection, firewalling and similar features if desired.

The secure remote access gateway 106 is communicatively connected to a Stealth network 130. The Stealth network 130 generally corresponds to a network managed within an enterprise, and which includes a plurality of Stealth network endpoints 132*a-c*, an authentication server 134, and a licensing server 136. The Stealth network 130 generally implements Stealth-based communications among endpoints within the Stealth network 130, as discussed in the applications incorporated by reference above. In example embodiments, the Stealth network 130 can be implemented using one or both of an IPsec-based Stealth implementation and a multi-level secure tunneling protocol (MLSTP)-based Stealth implementation, as is also described in the applications incorporated by reference above.

In the embodiment shown, the secure remote access gateway 106 includes a VDR broker 112 and a plurality of VDRs 114*a-d*. The VDR broker 112 interacts with the VPN server 104 and an authentication server 134, and the resources which instantiate instances of a virtual data relay (VDR), to establish routing of traffic to effectively allow a remote device to participate in the Stealth network 130.

The VDR broker 112 acquires a Stealth license; during the authentication and authorization process of each remote endpoint, the authorization manager of the VDR broker 112 will identify itself to the authentication server 134 as a VDR broker 112 for a remote device in an XML-based tuples request (discussed in further detail below), and identifies the authenticating user via HTTP. The authentication server 134 will then indicate to the VDR broker 112 that a Stealth remote system license is available for use. Details regarding example communication sequences useable to establish secure communications between a remote device 102 and Stealth network endpoints 132*a-c* are described in further detail below. However, in general, to ensure security the VDR broker 112 will not service client connections from remote devices without first securing appropriate licenses, from the authentication server 134 and/or licensing server 136.

The VDRs 114*a-d* operate as proxies for the remote devices 102*a-d*, respectively, with which they are associated. Generally, an instance of a VDR exists for each IPsec connection established by the VPN server 104. For example, if a secure connection is established on a per-device basis, each device will be associated with a different VDR 114 as in the embodiment shown.

Generally, each VDR 114 hosts a Stealth network endpoint. The endpoint has been authenticated by the authentication server 134. Traffic routes are established allowing traffic to flow between a stealth network endpoint 132 and the mobile device 102, based on the stealth network endpoint and the associated application (or device, or user, based on the level of granularity of security authorization as implemented).

The VPN server 104 will perform the IPsec authentication and tunnel address assignment with participation by the VDR broker 112. Accordingly, mobile device applications will connect to the VPN server 104 using a user ID for an IPsec authentication, which will also subsequently used for Stealth authentication via the authentication server 134.

Figure 2:
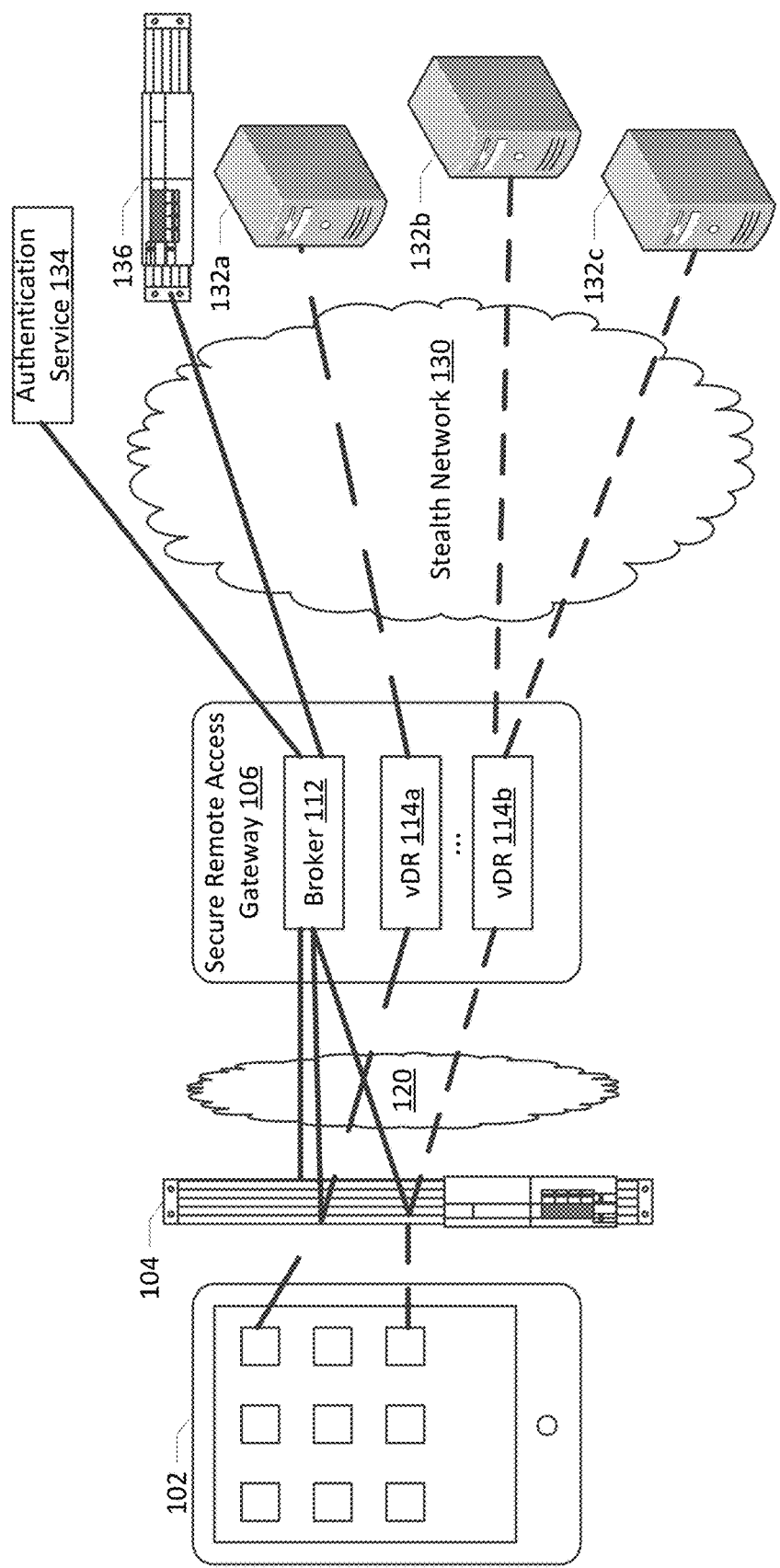
FIG. 2 illustrates a second example network in which secured remote communications can be implemented, according to the methods and systems described herein.

Referring now to FIG. 2, a generalized network 200 in which communication is enabled between a mobile device and one or more secure endpoints included within a secured network (e.g., an enterprise) is shown, according to an example alternative. The network 200 includes a mobile device 102*a* communicatively connected, via public network 110, to a secure remote access server 104 managed by a secured entity. The VPN server 104 allows for communication via a trusted subnet 120 to the secure remote access gateway 106.

In the embodiment shown, the mobile device 102 generally corresponds to any type of mobile device, such as a mobile phone, tablet, laptop, or other type of mobile device which may be used to connect to a secured network from a variable location and/or subnetwork. In the case of mobile phone and tablet devices, such a device may be an iOS-based device provided by APPLE Corporation of Cupertino, Calif., or an Android-based device provided by any of a number of equipment-manufacturers, and operating using a variant of the Android operating system provided by GOOGLE, Inc. of Mountain View, Calif. Other types of mobile operating systems could be used as well (e.g., BLACKBERRY, Microsoft's Windows Phone OS, or other operating systems). In preferred embodiments, the mobile device 102 either has a native IPsec implementation allowing it to communicate with a VPN server via an IPsec-based connection, or is capable of having installed thereon an application that manages such a secured connection over a public network. Consequently, the VPN server 104 provides a location at which the mobile device 102 can establish a secure connection to the enterprise, and which relays messages to the mobile gateway which effectively proxies the mobile device within the secure network, as discussed in further detail below. Accordingly, mobile device may be a trusted mobile device, or may alternatively have one or more trusted/secured applications executing thereon in conjunction with unsecured applications.

Although in the embodiment shown a single mobile device is illustrated, it is understood that this is intended as exemplary; however, in typical embodiments the mobile broker will manage connections associated with a plurality of different mobile devices, mobile device applications, and/or users.

In the example shown, different applications on the remote device 102 are each associated with different VPN-based connectivity, and have different security credentials. Accordingly, in such an example embodiment, different VDRs (shown as VDRs 114*a-b*) are associated with different applications on the same mobile device 102. In such embodiments, application-level authentication is used to the exclusion of device-level authentication, requiring a user to authenticate himself/herself within each application seeking a secured connection to Stealth network endpoints 132. This allows the remote device 102 of FIG. 2 to securely connect to Stealth network endpoints 132 of an enterprise, while concurrently allowing that same remote device to communicatively connect, for example via cleartext or known encryption protocols, with public or other unsecured network (e.g., Internet) locations.

Referring to FIGS. 1-2 generally, in example embodiments, and as discussed further below, the IPsec-based Stealth solution can be employed in either an entirely IPsec-based secure network, or within an existing Stealth network employing a traditional bit-based splitting and encrypting/decrypting arrangement, which utilizes an existing multi-level secure transport protocol (MLSTP) secure communications construct. In both configurations, all endpoints in the Stealth network are required to be licensed with a Stealth license that supports earlier versions of the Stealth security protocol. In addition, a Stealth appliance may be used, and all licensing and logging is provided through the Stealth appliance (or team of appliances). However, it is noted that a mixed Stealth configuration may be required when the IPsec-based system is deployed in an existing Stealth network in which endpoints are already running a previous Stealth configuration, or when the existing (or new) Stealth network must support otherwise unsupported endpoints (e.g., Windows XP, Windows 2003).

In addition, in the present disclosure, and as noted below, in both FIGS. 1-2, a Stealth-enabled application will be provided on each remote device to allow for secure capture of service connection credentials and user credentials. Additionally, a secure remote access gateway can maintain vDR instantiation and user connections, while the vDRs associated with each remote endpoint can connect internal to the enterprise to other endpoints within a common community of interest. This allows for support for a variety of types of remote and/or roaming workstations or mobile devices.

Figure 3:
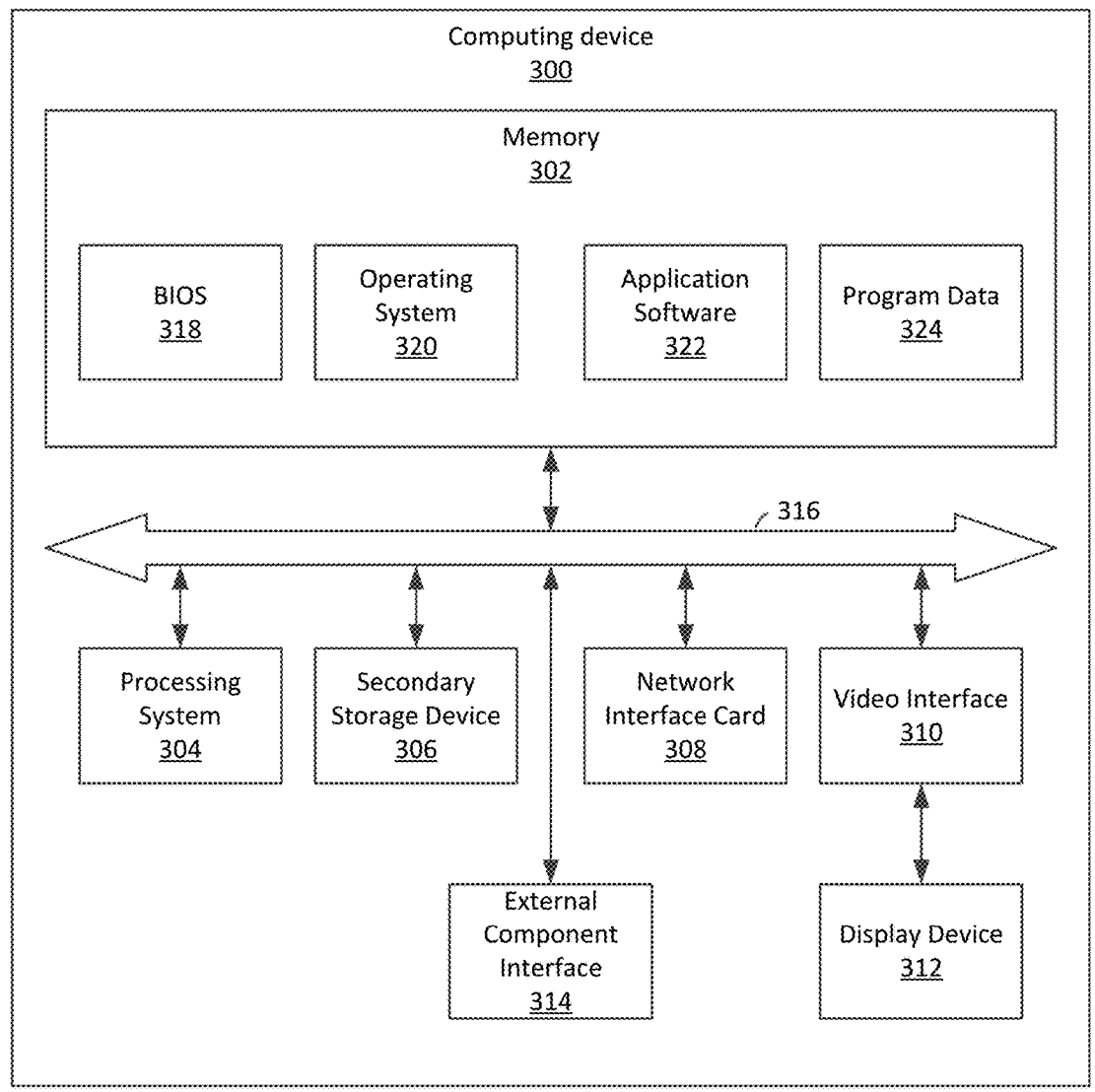
FIG. 3 is a schematic illustration of an example computing system in which aspects of the present disclosure can be implemented.

Referring now to FIG. 3, a schematic illustration of an example computing system in which aspects of the present disclosure can be implemented. The computing device 300 can represent, for example, a computing system capable of implementing the various features of FIGS. 1-2, including any of the variety of mobile devices 102 disclosed therein, the secure remote access gateway 106, Stealth network endpoints 132, or other systems. In particular, the computing device 300 represents the physical construct of an example computing system at which an endpoint or server could be established. In particular, in various embodiments, the computing device 300 implements one particular instruction set architecture, and can be used to execute non-native software and/or translate non-native code streams in an adaptive manner, for execution in accordance with the methods and systems described herein.

In the example of FIG. 3, the computing device 300 includes a memory 302, a processing system 304, a secondary storage device 306, a network interface card 308, a video interface 310, a display unit 312, an external component interface 314, and a communication medium 316. The memory 302 includes one or more computer storage media capable of storing data and/or instructions. In different embodiments, the memory 302 is implemented in different ways. For example, the memory 302 can be implemented using various types of computer storage media.

The processing system 304 includes one or more processing units. A processing unit is a physical device or article of manufacture comprising one or more integrated circuits that selectively execute software instructions. In various embodiments, the processing system 304 is implemented in various ways. For example, the processing system 304 can be implemented as one or more physical or logical processing cores. In another example, the processing system 304 can include one or more separate microprocessors. In yet another example embodiment, the processing system 304 can include an application-specific integrated circuit (ASIC) that provides specific functionality. In yet another example, the processing system 304 provides specific functionality by using an ASIC and by executing computer-executable instructions.

The secondary storage device 306 includes one or more computer storage media. The secondary storage device 306 stores data and software instructions not directly accessible by the processing system 304. In other words, the processing system 304 performs an I/O operation to retrieve data and/or software instructions from the secondary storage device 306. In various embodiments, the secondary storage device 306 includes various types of computer storage media. For example, the secondary storage device 306 can include one or more magnetic disks, magnetic tape drives, optical discs, solid state memory devices, and/or other types of computer storage media.

The network interface card 308 enables the computing device 300 to send data to and receive data from a communication network. In different embodiments, the network interface card 308 is implemented in different ways. For example, the network interface card 308 can be implemented as an Ethernet interface, a token-ring network interface, a fiber optic network interface, a wireless network interface (e.g., WiFi, WiMax, etc.), or another type of network interface.

The video interface 310 enables the computing device 300 to output video information to the display unit 312. The display unit 312 can be various types of devices for displaying video information, such as an LCD display panel, a plasma screen display panel, a touch-sensitive display panel, an LED screen, a cathode-ray tube display, or a projector. The video interface 310 can communicate with the display unit 312 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 314 enables the computing device 300 to communicate with external devices. For example, the external component interface 314 can be a USB interface, a FireWire interface, a serial port interface, a parallel port interface, a PS/2 interface, and/or another type of interface that enables the computing device 300 to communicate with external devices. In various embodiments, the external component interface 314 enables the computing device 300 to communicate with various external components, such as external storage devices, input devices, speakers, modems, media player docks, other computing devices, scanners, digital cameras, and fingerprint readers.

The communication medium 316 facilitates communication among the hardware components of the computing device 300. In the example of FIG. 3, the communications medium 316 facilitates communication among the memory 302, the processing system 304, the secondary storage device 306, the network interface card 308, the video interface 310, and the external component interface 314. The communications medium 316 can be implemented in various ways. For example, the communications medium 316 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 302 stores various types of data and/or software instructions. For instance, in the example of FIG. 3, the memory 302 stores a Basic Input/Output System (BIOS) 318 and an operating system 320. The BIOS 318 includes a set of computer-executable instructions that, when executed by the processing system 304, cause the computing device 300 to boot up. The operating system 320 includes a set of computer-executable instructions that, when executed by the processing system 304, cause the computing device 300 to provide an operating system that coordinates the activities and sharing of resources of the computing device 300. Furthermore, the memory 302 stores application software 322. The application software 322 includes computer-executable instructions, that when executed by the processing system 304, cause the computing device 300 to provide one or more applications. The memory 302 also stores program data 324. The program data 324 is data used by programs that execute on the computing device 300.

Although particular features are discussed herein as included within a computing device 300, it is recognized that in certain embodiments not all such components or features may be included within a computing device executing according to the methods and systems of the present disclosure. Furthermore, different types of hardware and/or software systems could be incorporated into such an electronic computing device.

If implemented in firmware and/or software, the functions described herein may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

Computer storage media generally includes at least some tangible, non-transitory media and can, in some embodiments, exclude transitory wired or wireless signals. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as Wi-Fi, acoustic, radio frequency (RF), infrared, and other wireless media. In accordance with the present disclosure, the term computer readable media as used herein may include computer storage media, but generally excludes entirely transitory embodiments of communication media, such as modulated data signals.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

It is noted that, although in the embodiments of FIG. 3 shown the computing device 300 represents a physical computing system, the various endpoints and servers of the present disclosure need not be directly implemented on a hardware-compatible system. Rather, such endpoints or servers could be implemented within a virtual computing system or virtual partition of a computing system. In some embodiments, the endpoints and/or servers of the present disclosure are implemented in a partitioned, multiprocessor environment, with the various partitions in which endpoints and/or servers reside being managed by a system virtualization software package. One such system virtualization package is the Unisys Secure Partitioning (SPar) partitioning and virtualization system provided by Unisys Corporation of Blue Bell, Pa.

In general the endpoints of the present disclosure can be configured various ways, with registry settings selected to configure the endpoint to communicate according to an appropriate communication protocol. In some example embodiments, each IPv6-based system includes a capability to communicate with the authorization server via either IPv4 or IPv6 communications. Other administrator-selected IP-based protocols could be used as well.

Figure 4:
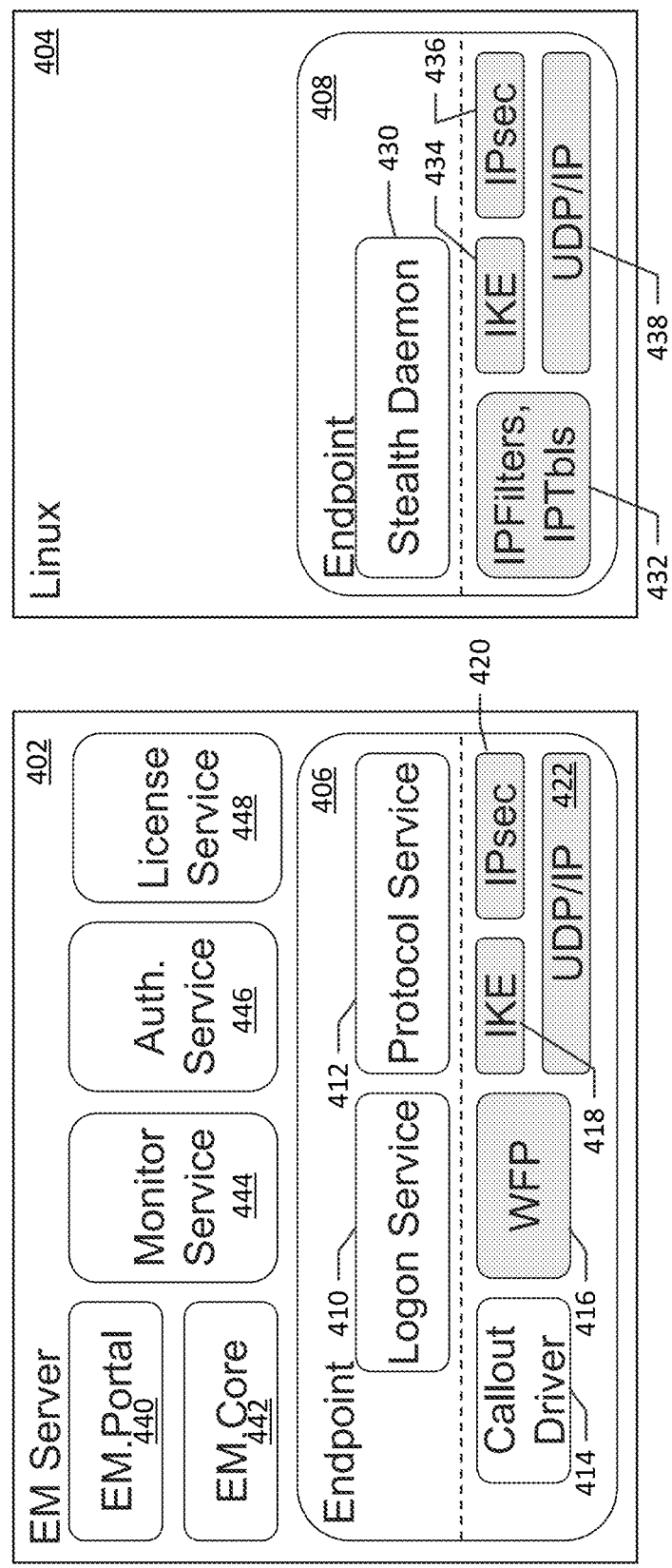
FIG. 4 is an example block diagram of relevant portions of an endpoint implementing the secured communications architecture, as discussed herein.

Referring to FIG. 4, an example arrangement of an enterprise management server 402 and a typical Stealth-enabled endpoint 404 are disclosed. The enterprise management server 402 can, for example, be accessible by an administrative user to configure a Stealth-based network, including communities of interest, enclaves including computing systems defined to be included in such communities of interest, and other network configuration data. In example embodiments, as further discussed herein, the enterprise management server 402 can also provide authorization services, and be located either within an enterprise, or in some limited configurations at a remote office.

In the embodiment shown the enterprise server 402 includes endpoint software 406 installed thereon; similarly, endpoint 404 can be, for example, a Linux-based endpoint and includes endpoint software 408 compatible with such a Linux implementation installed thereon. The endpoint software 406 includes a logon service 410 and a protocol service 412 that enables user-logon and communications from higher-level software installed at the enterprise server 402. The endpoint software 406 further includes a callout driver 414, Windows Filtering Platform (WFP) driver 416, and IKE driver 418, typically available in a Windows-based system. The endpoint software further includes IPsec module 420 that enables IPsec-based communications, and UDP/IP module 422, which implements IP-based communications. Details regarding connectivity operations of the endpoint software 406 in conjunction with an IPsec-based Stealth implementation are provided in copending U.S.

patent application Ser. No. 14/753,120, filed on Jun. 29, 2015, and entitled "SECURED NETWORKS AND ENDPOINTS APPLYING INTERNET PROTOCOL SECURITY" the disclosure of which is incorporated herein by reference in its entirety.

Similar to endpoint software 406, endpoint software 408 includes a Stealth daemon 430 that may trigger a Stealth connection, IPfilters and IPtables 432, IKE 434, IPsec module 436, and UDP/IP module 438. Such modules and tables generally provide analogous functionality to the endpoint software 406 of the enterprise server 402, with the Stealth daemon 430 corresponding to the logon service 410, protocol service 412, and callout driver 414. IPfilters and IPtables 432 are analogous to the WFP driver 416. Accordingly, such features are also described in the above-referenced patent application. An applet may also be installed at endpoint software 408, to provide a user interface and storage of connection information associated with a Stealth-based connection.

In the embodiment shown, the enterprise management server 402 includes enterprise management software, including an enterprise management portal 440, an enterprise management core 442, a monitor service 444, an authorization service 446, and a license service 448. The enterprise management portal 440 provides a user interface accessible by an administrative user to establish security settings for an enterprise Stealth network or subnetwork, stored in enterprise management core 442. Monitor service 444 can monitor operations across a Stealth-enabled network for logging by the enterprise management core 442. Details regarding Stealth enterprise management are provided in U.S. patent application Ser. No. 14/688,348, filed on Apr. 16, 2015 entitled "ENTERPRISE MANAGEMENT FOR SECURE NETWORK COMMUNICATIONS OVER IPSEC", the disclosure of which is hereby incorporated by reference in its entirety.

The authorization service 446 and license service 448 manage grant of Stealth communications permissions to endpoints, including authorizing and issuing credentials to such endpoints, as well as managing licenses and filters to be provided to such endpoints for maintaining authorization and authentication. Details regarding some uses of such services are provided in detail below. Generally, authorization and licensing services 446, 448 can be included in such an enterprise management server 402, or could be implemented on an entirely separate server altogether, depending on a chosen implementation. Furthermore, and as noted below, in some scenarios, the enterprise management server 402 may be located within an enterprise network, but certain functionality associated with authentication/authorization may be desirable to maintain external to the enterprise (e.g., at a separate, unsecured facility associated with the enterprise).

Referring to FIG. 4, generally, it is noted that each endpoint, such as endpoint 404, may in different implementations be configured for use with secured or non-secured content, and may or may not be compatible with Stealth systems. Accordingly, various cases are considered herein when describing an extent to which trusted communication to such a remote endpoint is allowed. For example, in some scenarios, endpoints having entirely secured content may be allowed to connect to the enterprise as unmanaged endpoints, and appear, in effect, as mobile users connecting via a VDR as described above in connection with FIGS. 1-2. Such endpoints may be implemented with secure applications, such as those wrapped with Mocana Mobile Application Protection (MAP) software, and may include any such endpoint having an IPsec-based VPN client. Such endpoints may also connect to other remote endpoints via Stealth-enabled protocols, as well as to a remote office or cloud-based devices, such as devices managed using a Choreographer software solution by Unisys Corporation of Blue Bell, Pa.

However, in other scenarios endpoints having partially secured content may be desired to connect to an enterprise. In such scenarios, an enterprise management system can authenticate, authorize, and log actions by the endpoint, but may limit that endpoint from using a full secure communications protocol in connection with the authorization service 446. Rather, such endpoints may be required to use other authentication mechanisms (e.g., MSLTP-based) to obtain authorization, at which time those endpoints may securely communicate with other endpoints via the Stealth secure communications protocol.

It is noted that in some embodiments, the authentication server can perform authentication and authorization services, including assigning a role to each particular endpoint. In such arrangements, both enterprise-side and remote office authorization servers may be included in a network, and may cooperate to authenticate and authorize remote endpoints. For example, an enterprise authentication server can be used to provision each of a variety of internal and external endpoints, including enterprise workstations and servers, as well as roaming workstations. A secure remote access broker vDR could be used with such a server to authenticate remote office workstations and servers, remote office authorized workstations and servers, roaming workstations residing in a remote location, or isolated endpoints. A remote office authentication server, on the other hand, could be used to provision remote office authorized workstations and servers to provide COIs within the remote office and/or allow clear text access to the Internet from the remote office. In some further embodiments, a secure remote access authentication server could also be used to authenticate and authorize (e.g., provision) remote office workstations and servers, roaming workstations, and/or isolated endpoints.

Figure 5:
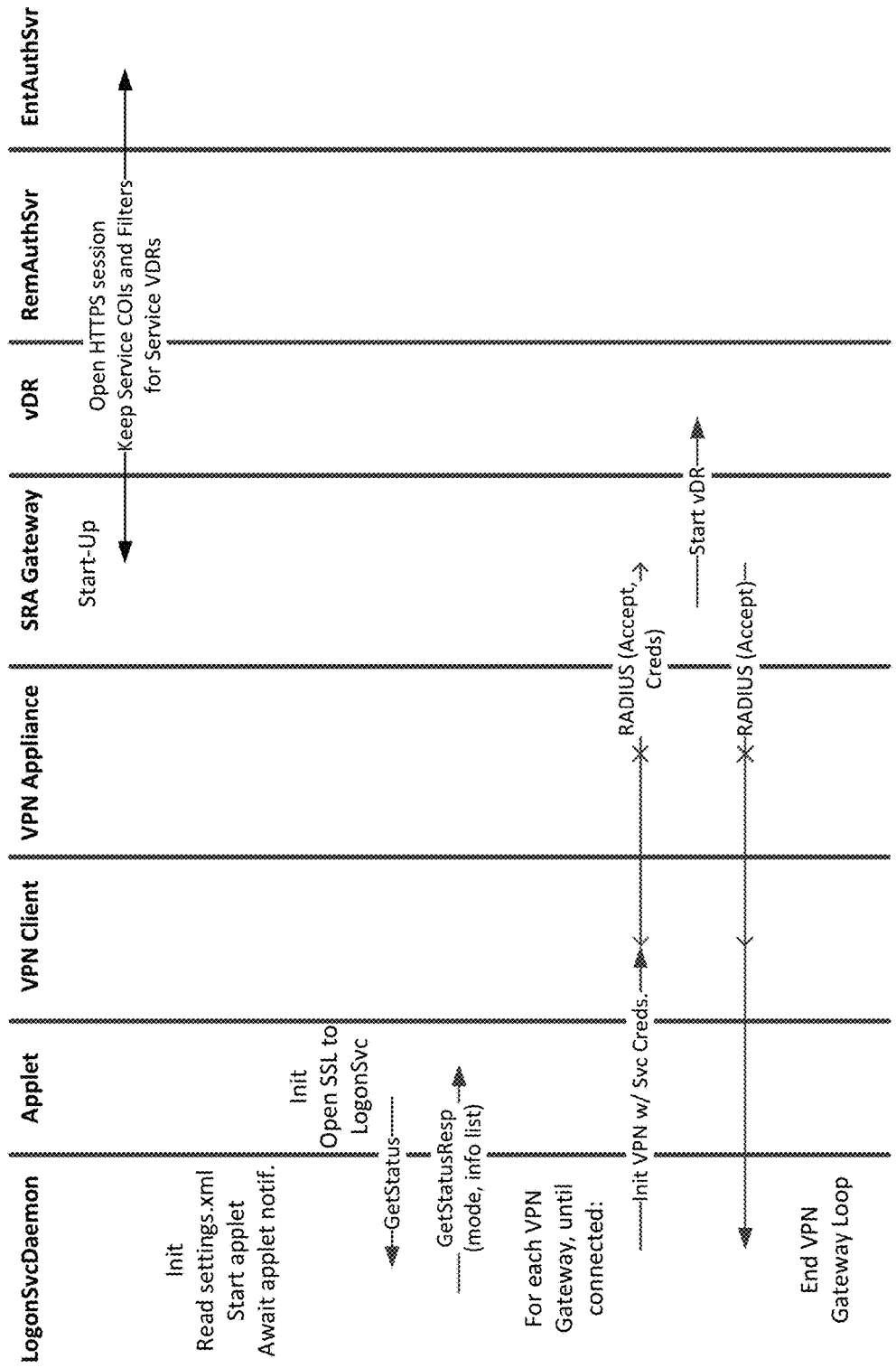
FIGS. 5-7 illustrate a communication sequence that can be used to connect a remote computing system to an enterprise via a secure remote access gateway.
Figure 6:
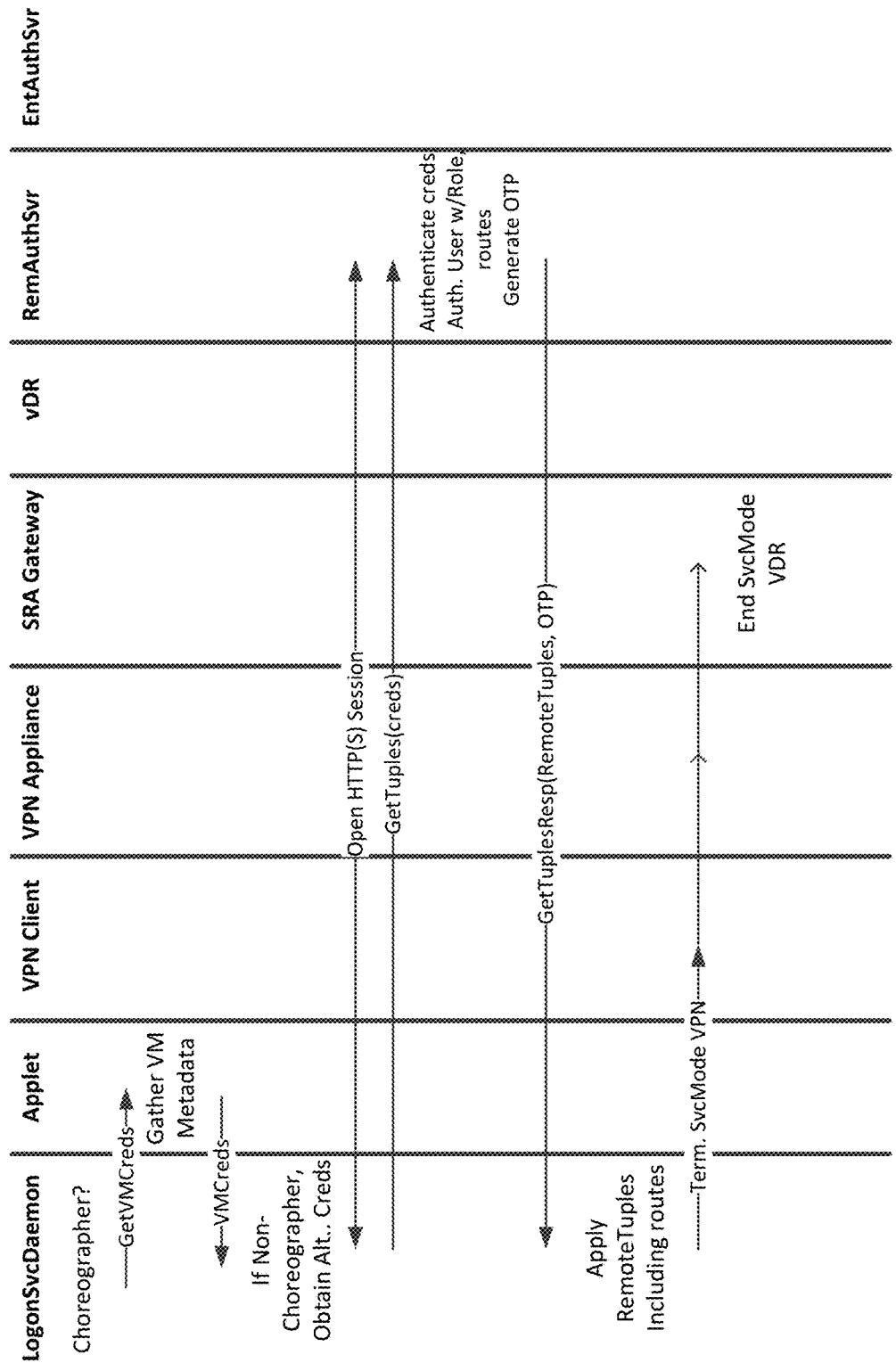
Figure 7:
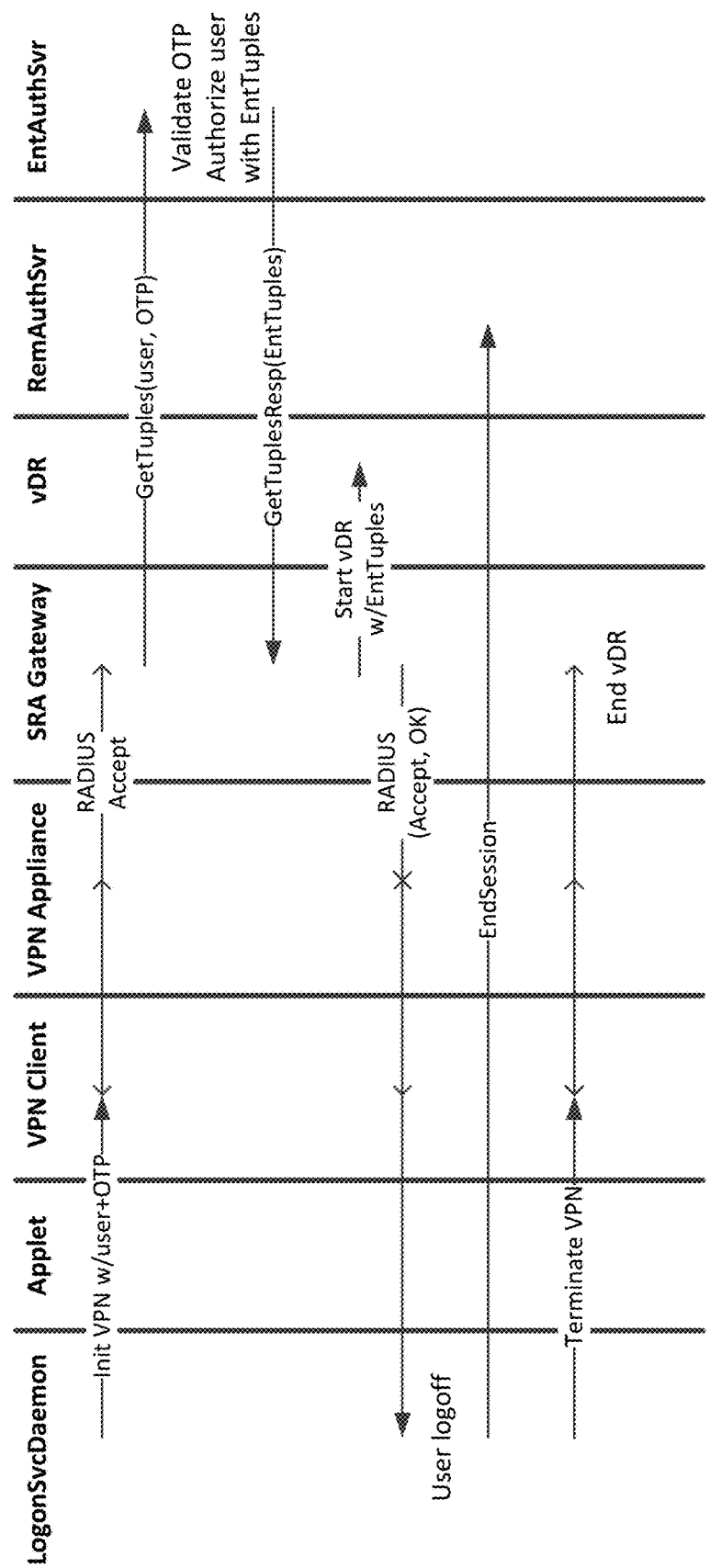

Referring to FIGS. 5-7, an example illustration of a communication sequence 500 that can be used to connect a remote computing system to an enterprise via a secure remote access gateway is shown. The communication sequence 500 provides an arrangement by which a remote device, such as a remote computing system or other endpoint, can communicate with an enterprise securely, whether the remote endpoint is fully or partially trusted. Generally, the communication sequence 500 provides a three-phase authentication and authorization process in which a service mode phase (seen in FIG. 5) allows for use of well-known service credentials initially, then to a remote authentication and authorization phase (seen in FIG. 6) using a one-time password, which allows the remote endpoint to obtain its authentication credentials. The user (e.g., the remote device or secured application executing thereon) can then personally authenticate (as seen in FIG. 7), leading to individualized rights granted to a particular user based on membership in one or more communities of interest.

Overall, the three-phase connection sequence 500 is illustrated with each phase associated with FIGS. 5-7, respectively. Although specific details are provided below, FIG. 5 generally shows a first, service mode phase in which global, well-known service credentials are used by a remote device. An applet on the remote device opens a native IPsec-based VPN connection using such service credentials, and a secure remote access gateway (e.g., gateway device 106) allocates a service vDR having only a service community of interest membership. Accordingly, the service vDR can only connect with an authentication service (e.g., service 134, 446 of FIGS. 1-2 and 4, respectively), and optionally other service devices, such as a Domain Name Service (DNS). A remote authentication and authorization process in which endpoint software (e.g., endpoint software 408) finds an authentication service 446 that supports secure remote authentication, and the endpoint then uses "user" credentials for remote authentication and authorization. In example cases, such user credentials can include credentials assigned to endpoint software, obtained from an applet executing on the remote device or associated service, a PKI certificate, or other types of sources. These credentials include remote credentials that are used to secure the connection from a remote endpoint to the enterprise (e.g., to a vDR), and enterprise credentials used to secure the connection from the vDR to endpoints within an enterprise. Such credentials can be, for example, based on username/password, smart card (for remote credentials), a one-time password with time limitation, or other types of credentials.

As seen in FIG. 6, the authentication service returns "remote" role information to the remote device. This remote role information can include communities of interest, filters, and other information useable by a remote device to (1) securely communicate with endpoints within an enterprise within a common community of interest and (2) allow cleartext communications with authorized other endpoints, and/or (3) block incoming traffic from one or more selected addresses/devices. The authentication service will return a randomly-generated, time-bound one-time password (OTP) for use by the remote endpoint.

As seen in further detail in FIG. 7, the Applet will close the service mode IPsec-based VPN connection, and the enterprise software will provide to the applet the username and OTP to the Applet. The Applet can then open a new IPsec-based VPN connection using one-time credentials. The SRA gateway passes the one-time credentials to the authentication service, which returns an enterprise-side role (including communities of interest, filters, etc.) and authorizes a vDR using the role information. Accordingly, the remote endpoint and user will receive a first set of communities of interest and filters for use in communications outside the enterprise (and returned to the actual remote endpoint) and a second set of communities of interest and filters managed by the vDR and used for communication with endpoints within the enterprise. Accordingly, community of interest keys and filters used within the enterprise are not required to be distributed outside of the enterprise, while still allowing for communication with remote endpoints.

Now referring to FIG. 5 in detail, additional features of the first phase of a connection sequence 500 is shown. In the example shown, a secure remote access gateway (e.g., gateway 106) is started, and initiates an HTTP(S) session to an authorization service on an enterprise management device (e.g., enterprise management server 402) using a license vDR. At some point, a logon service or daemon initializes at a remote endpoint, and reads a settings tile, such as an XML based settings tile. An applet installed on the remote endpoint is started, and the logon service/daemon builds a VPN IPsec-based connection.

When the applet initializes on the remote device, that applet opens an SSL-based dialog to the logon service/daemon, and transmits a GetStatus( ) request to that logon service/daemon. The logon service/daemon sets a mode of operation and VPN information, including VPN gateway information (IP address, service credentials, etc.) for connection to a VPN gateway. Until a VPN client connects to a VPN gateway, the logon service/daemon will initiate a VPN connection to a particular VPN gateway of an enterprise using an endpoint VPN client. The VPN client connection will trigger a RADIUS Accept request from a VPN gateway to a secure remote access gateway (e.g., SRA gateway 106), which initializes a service vDR using a service community of interest key, and also apply any filters defined with that service community of interest (e.g., to prevent communications to/from unauthorized endpoints). In embodiments, the service community of interest and filter(s) should provide adequate network access within an enterprise to perform session requests to authentication servers, while otherwise limiting access.

The secure remote access gateway will return a RADIUS response back to the VPN Appliance with a private IP Address, which completes the VPN tunnel initiation to the remote device via the VPN client. The VPN client can return success to the logon service/daemon.

Referring to FIG. 6, further details regarding a second phase 600 of the connection sequence 500 is shown, according to an example embodiment. As illustrated in FIG. 6, the logon service/daemon available at an endpoint will determine if the endpoint is part of secure cloud-based virtualized implementation, for example as part of the Choreographer service from Unisys Corporation of Blue Bell, Pa. If it is part of such a secure cloud-based virtualization service, the logon service/daemon will request virtual machine credentials from the applet, which gathers metadata associated with a virtual machine seeking connection to the enterprise. The applet returns the metadata as credentials to the logon service/daemon. However, if the endpoint is not part of such a cloud-based virtualization service, the logon service/daemon will obtain alternative credentials, for example as specified in a settings XML file, or by requesting such credentials from the applet on demand (which may in turn prompt a user).

Once credentials are obtained, the logon service/daemon will open an HTTP(S) session with the authentication service (e.g., service 446) using received credentials to authenticate the session (rather than the previous service credentials). The logon service/daemon sends a GetTuples request with credentials and a remote authentication flag indicating this is a remote authorization request. The authentication service will authenticate the credentials, and authorizes the user with a particular "remote" role. In some embodiments, an external credentialing service may be used, for example in the case of a cloud-based virtualization system seeking connection to an enterprise. The authentication service will further generate a One-Time Password (OTP) by encrypting an expiration timestamp with a shared key known to both a remote authentication server and an enterprise authentication server. The authentication service then sends a session tuple action response with remote role tuples (RemTuples) and the OTP back to the logon service/daemon, which applies the RemTuples, including routes. The logon service/daemon then terminates the service mode IPsec-based VPN connection, and the secure remote access gateway shuts down the service mode vDR used for authentication.

Referring now to FIG. 7, additional details regarding a third phase 700 of the connection sequence 500 is shown, according to an example embodiment. In this third phase, the logon service/daemon initializes a new VPN connection using a username and the one-time password. The VPN appliance to which the client device connects issues a RADIUS Accept request to the secure remote access gateway including the username and OTP. The secure remote access gateway provides a session tuple action request over a license vDR to an enterprise authentication server with the username and OTP, and the authentication server will validate the OTP by decrypting it with a key shared with remote authentication servers. The authentication server will also ensure that the timestamp associated with the OTP has not expired, and verifies that it has not been previously used. The authentication server then authorizes a user with enterprise-side tuples (EntTuples), and sends a session tuple actions response including the EntTuples to the secure remote access gateway.

The secure remote access gateway will start a vDR and authorize it for use with the received EntTuples, and sends RADIUS Accept response with a private IP Address to the VPN appliance; the VPN appliance and client resident on the remote endpoint complete VPN tunnel initialization. At this time, secure communication between the remote endpoint and the enterprise (those entities within the enterprise accessible via the vDR and associated enterprise-side tuples).

Once the user completes his/her session and logs off, or security is otherwise disabled, the logon service/daemon issues a session endSession action to the remote authentication server, and ends the VPN connection. The secure remote access gateway ends the associated vDR, thereby terminating the session.

Referring now to FIGS. 8-15, example endpoint configurations are shown, corresponding to possible endpoints that may be remotely connected to an enterprise via a secure remote access gateway. Each such endpoint may include a plurality of attributes; details regarding such attributes are briefly described before specific configurations of endpoints and/or endpoint connections to an enterprise.

In general, each endpoint managed by an authentication and authorization service may have an endpoint mode, which identifies a mode through which settings are provided to determine an endpoint configuration package. The endpoint mode can be set in a settings XML file distributed to the endpoint. Example endpoint modes include enterprise workstation, enterprise server, roaming workstation, remote office workstation, remote office server, isolated endpoint, remote office authorized workstation, and remote office authorized server. Other endpoint modes could be used as well.

In addition to endpoint modes, other attributes can include a secure remote access enabled flag, a secure remote access capable flag (i.e., if SRA-based connections are accepted), a Stealth mode (e.g., enabled, disabled, or override enablement at startup), a credential override attribute, a default credentials attribute, an SRA endpoint configuration attribute (including gateway IP address, set of certificates, and service mode username/password), a service role containing service communities of interest and filters, an authorization group, and a remote role to be defined during provisioning and returned to the endpoint as part of a tuples message. Based on such attributes, different types of configurations of endpoints can be determined, for example as defined below in Table 1:

TABLE 1

Endpoint Attributes and Resulting Configuration

| SRACapable | SRAEnabled | DefCreds | Creds Override | StealthMode | Configuration |
|---|---|---|---|---|---|
| No | No | No | Yes | Any | Enterprise Workstation w/SvcRole |
| No | No | Yes | No | Enabled | Enterprise Server |
| No | No | Yes | Yes | Any | Enterprise Workstation w/DefCreds |
| Yes | No | No | Yes | Any | Roaming Workstation | Remote Office Authorized Workstation |
| Yes | No | Yes | No | Enabled | Remote Office Authorized Server |
| Yes | No | Yes | Yes | Any | Roaming Workstation w/DefCreds |
| Yes | Yes | No | Yes | Enabled | Remote Office Workstation |
| Yes | Yes | Yes | No | Enabled | Remote Office Server | Isolated Endpoint |
| Yes | Yes | Yes | Yes | Enabled | Remote Office Workstation w/DefCreds |

Figure 8:
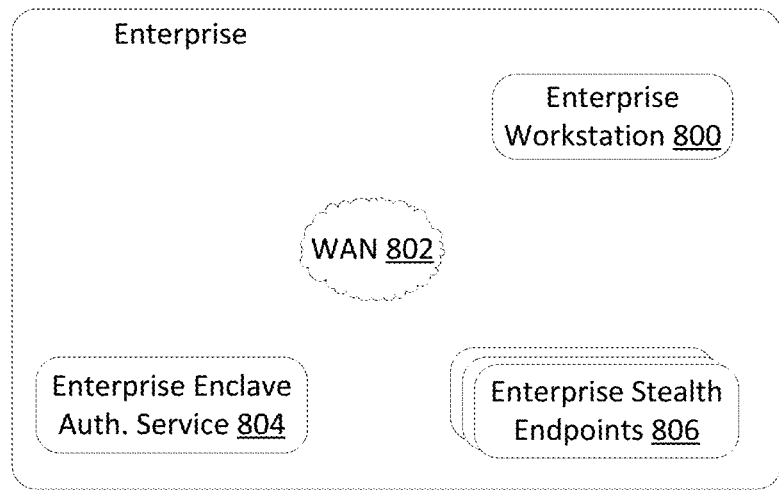
FIG. 8 illustrates an example enterprise workstation that may be incorporated into an enterprise, according to an example embodiment of the present disclosure.

Referring now to FIG. 8 specifically, an example enterprise workstation 800 is shown that may be connected to an enterprise, according to an example embodiment of the present disclosure. In example embodiments, an enterprise workstation 800 corresponds to a workstation permanently installed within an enterprise, for example via a WAN 802 to an enterprise enclave authentication service 804 and other enterprise stealth endpoints 806. It is typically fixed in place (e.g. under a desk), although it could be laptop that can be moved within the enterprise, but may not be removed from the premises.

On an enterprise workstation 800, endpoint secure remote access cannot be enabled (SRACapable=false). On a Windows endpoint, an applet option to enable secure remote access is also disabled, and default credentials may be provided and they may be overridden when a user logs on. In an enterprise workstation 800, if the Stealth mode is set to "enabled", then Stealth is enabled at startup. In this mode, Stealth authorization begins immediately if default credentials are available or when a user logs on if a credential override is true.

If the Stealth mode of the enterprise workstation 800 is set to "disabled", then it is disabled (clear text) at startup and it must be enabled via an applet existing on the endpoint. Stealth can be disabled and re-enabled. In this mode Stealth authorization begins when Stealth is enabled via the Applet. If default credentials are available they are used for Stealth authorization; otherwise the credentials of the currently logged on user or those enter by the user via the applet are used for Stealth authorization.

If the Stealth mode is set to "override", then secured communications via Stealth are enabled at startup but can be disabled and re-enabled via the applet. In this mode, Stealth authorization begins immediately if default credentials are available or when a user logs on if CredOverride is true. Once disabled, the endpoint returns to clear text mode and Stealth can be re-enabled and re-authorized via the applet.

Figure 9:
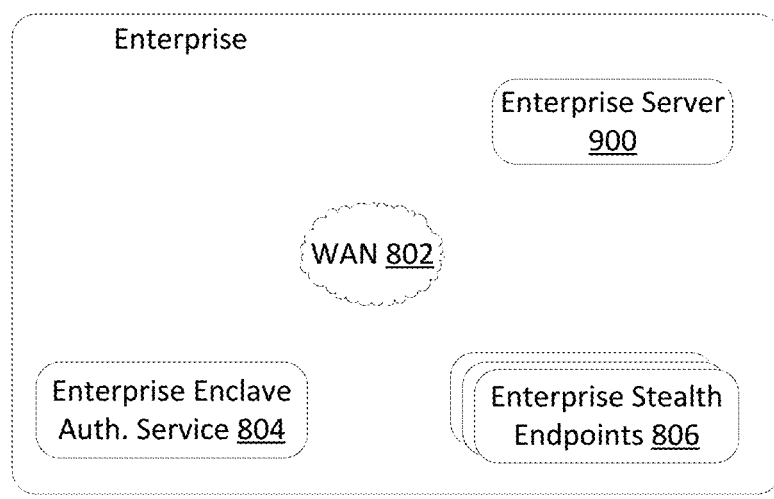
FIG. 9 illustrates an example enterprise server that may be incorporated into an enterprise, according to an example embodiment of the present disclosure.

FIG. 9 illustrates an example enterprise server 900 that may be incorporated within an enterprise, according to an example embodiment of the present disclosure. The enterprise server 900 is configured to be permanently installed within the enterprise, and as such cannot be enabled with secure remote access. Default credentials must be provided and are prevented from being overridden. If default credentials are not available during startup, an error message is written to an application event log and the endpoint remains in service mode.

The Stealth mode attribute for an enterprise server 900 must be set to "enabled". In this mode Stealth authorization begins immediately using the default credentials and these credentials cannot be overridden. If/when users log on/off an Enterprise Server Stealth communications are not interrupted and continue using the Stealth COIs obtained during authorization.

Figure 10:
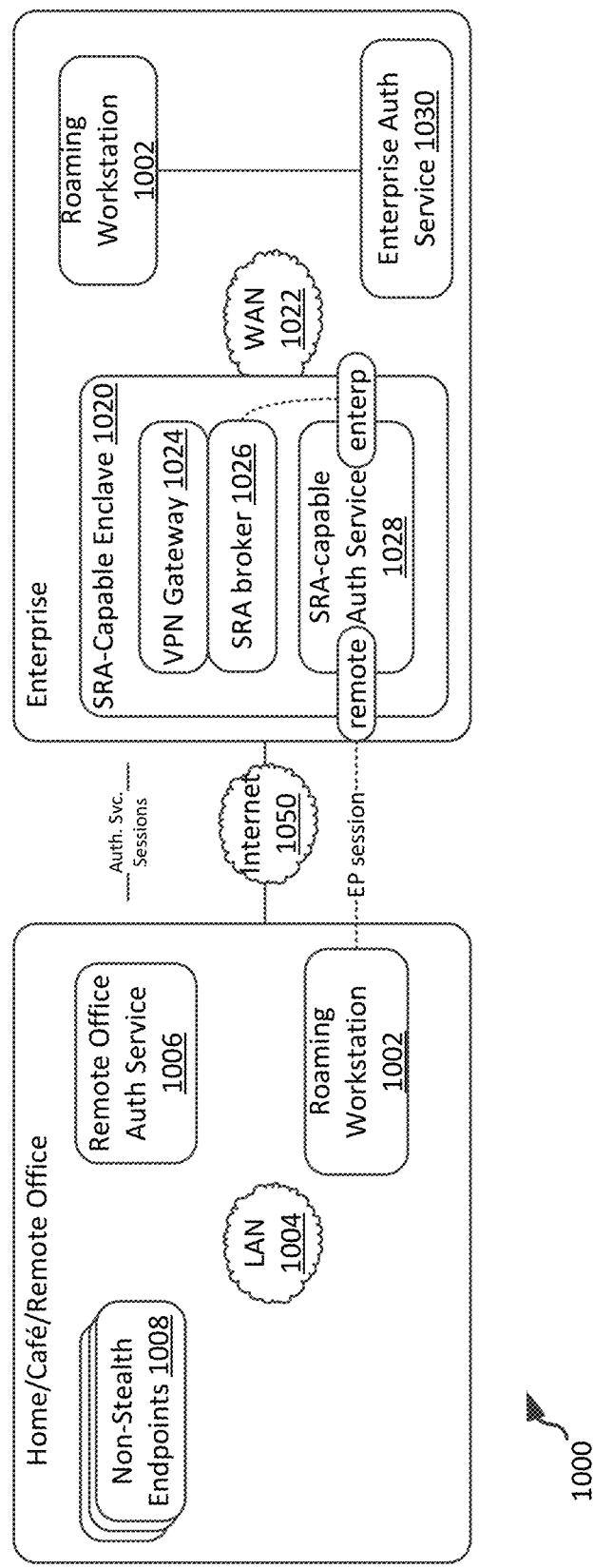
FIG. 10 illustrates an example roaming workstation topology in which a remote system may be remotely connected to an enterprise via a secure remote access gateway, according to an example embodiment of the present disclosure.

FIG. 10 illustrates an example roaming workstation topology 1000 in which a remote system may be remotely connected to an enterprise via a secure remote access gateway, according to an example embodiment of the present disclosure. In the roaming workstation topology 1000, a roaming workstation 1002 corresponds to a device (e.g. a laptop) that may be connected within an enterprise, at home, at a hotel, or at a remote office of the enterprise. The remote office may include a remote office authentication service 1006 that can be accessed via LAN 1004. Other non-Stealth endpoints 1008 may be included at the remote office as well. The roaming workstation 1002 is connectable to an enterprise via a secure remote access gateway, and in particular by connecting to a secure remote access enclave 1020 connected to enterprise endpoints via a WAN 1022. The secure remote access enclave 1020 includes the VPN gateway 1024, an SRA broker 1026, and an SRA-capable authentication service 1028 that allows for both remote and enterprise authentication via communities of interest (COIs) and filters. An enterprise authentication service 1030 can be used to authenticate a roaming workstation if that workstation is located within the enterprise, as shown.

On a roaming workstation 1002, SRA can be enabled and disabled through an applet option. Default credentials may be provided and they may be overridden when a user logs on. If SRA is enabled through the applet, local Stealth communications are shutdown and the SRA connection is enabled. When SRA is disabled, the endpoint disconnects the SRA communications and automatically re-enables local Stealth authorization, assuming that it is within the enterprise.

When the roaming workstation 1002 is at home or a hotel, clear-text access to the Internet is allowed by the Remote Role (RemRole) that is authorized. When at home or a hotel, the RemRole may restrict or require the use of the Stealth communication protocols for secure communications locally, depending on whether the workstation is located within a remote office of the enterprise.

Figure 11:
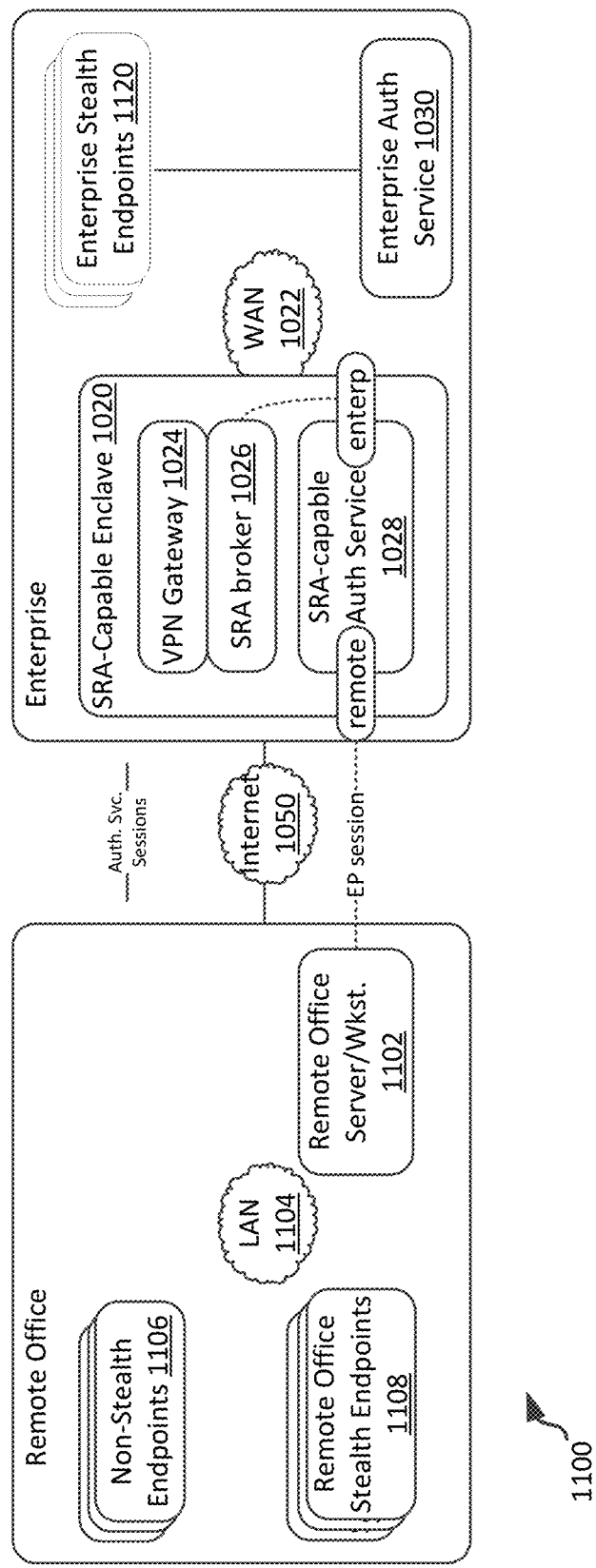
FIG. 11 illustrates an example remote office server or workstation topology in which a remote system may be remotely connected to an enterprise via a secure remote access gateway, according to an example embodiment of the present disclosure.

FIG. 11 illustrates an example remote office server or workstation topology 1100 in which a remote system, such as a remote office endpoint 1102, may be remotely connected to an enterprise via a secure remote access gateway, according to an example embodiment of the present disclosure. In this topology, a remote office endpoint configuration is a computing endpoint 1102 that is permanently installed in a remote office of an enterprise. It is typically fixed in place (e.g. under a desk), although it could be laptop that can move around within the remote office, but may not be removed from the premises. If the remote office endpoint configuration is associated with a server located in a remote office of an enterprise, connectivity to the enterprise is also through the Internet 1050. The remote office endpoint 1102 can be connected to other remote office Stealth endpoints 1108 and non-Stealth endpoints 1106 via a LAN 1104 at the remote office. In this instance, enterprise stealth endpoints 1120 may use the enterprise authentication service 1030, but the remote office endpoint 1102 may simply use the SRA-capable Authentication service 1028 since they are intended to be at least semi-permanently located at the remote office.

On a remote office workstation endpoint both secure remote access and Stealth are automatically enabled at startup and cannot be disabled through the applet installed on that device. Default credentials may be provided and they may be overridden when a user logs on. In this mode the secure remote access connection to an enterprise is established at startup and Stealth is enabled in a service mode. Stealth authorization may begin immediately after the SRA connection has been established. A remote office workstation generally will not allow clear text mode but clear text filers may be used to access non-Stealth enabled endpoints (i.e. printers) in a remote office.

On a remote office server endpoint, both secure remote access and Stealth are automatically enabled at startup and cannot be disabled through the applet. Default credentials must be provided and they cannot be overridden. If default credentials are not available an error message is written to an application event log and the endpoint remains in service mode. In this mode the secure remote access connection is established at startup and Stealth is enabled in service mode. Stealth authorization begins immediately after the secure remote access connection has been established using the default credentials. A remote office server generally does not run in clear text mode but clear text filers may be used to access non-Stealth enabled endpoints in the remote office.

Figure 12:
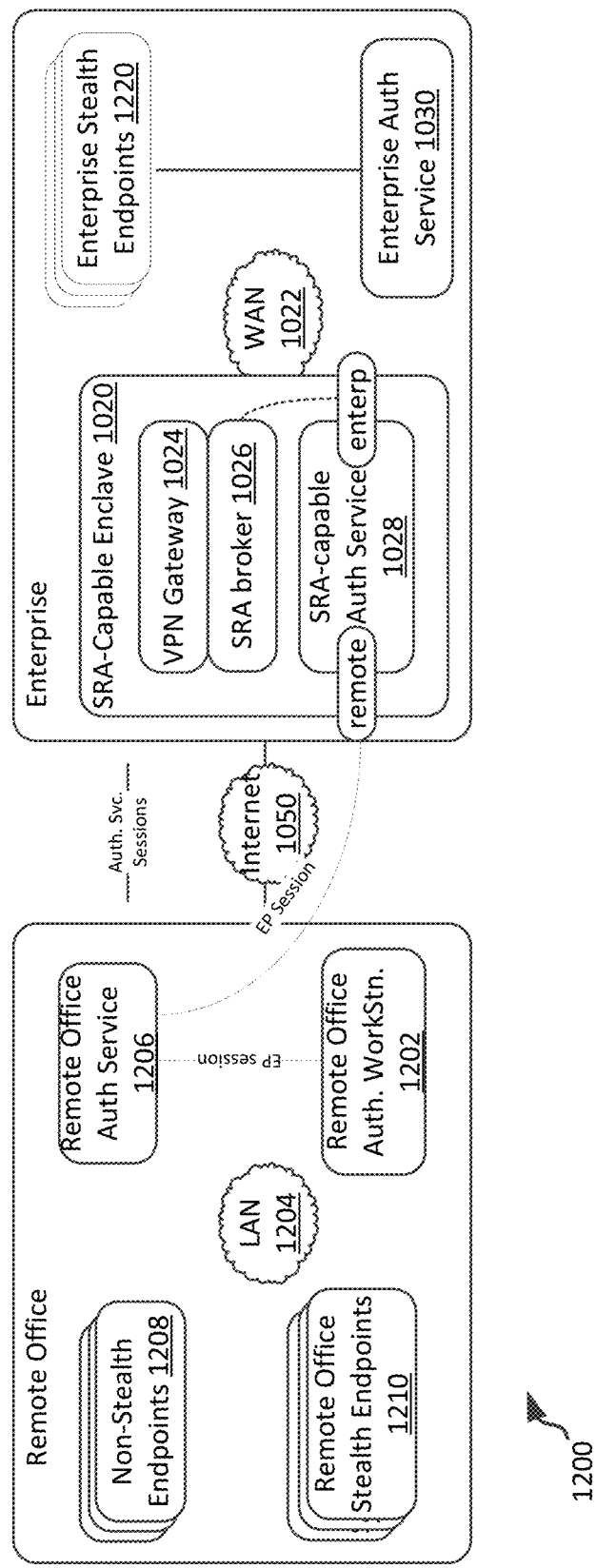
FIG. 12 illustrates an example remote office authorized server or workstation topology in which a remote system may be remotely connected to an enterprise via a secure remote access gateway, according to an example embodiment of the present disclosure.

FIG. 12 illustrates an example remote office authorized server or workstation topology 1200 in which a remote system may be remotely connected to an enterprise via a secure remote access gateway, according to an example embodiment of the present disclosure. In this example, a remote office authorized endpoint, such as a server or workstation, is a computing system permanently installed in a remote office of an enterprise. It is typically fixed in place (e.g. under a desk), although it could be laptop that can move around within the remote office, but may not be removed from the premises. Connectivity to the enterprise is through the Internet 1050.

Authorization of the endpoint is done using an authentication server 1206 located in the remote office and connected via LAN to a remote office authorized endpoint 1202. As in FIG. 11 remote office authorized endpoint 1102 can be connected to other remote office Stealth endpoints 1208 and non-Stealth endpoints 1206 via the LAN 1204 at the remote office.

In this example configuration, connectivity by the remote office authorized endpoint 1202 is automatically enabled to the enterprise after authorization has completed. The name of the endpoint mode will generally be used on the endpoint to identify the configuration and enable secure remote access after authorization successfully completes relative to the remote office authentication service 1206.

On a remote office authorized endpoint 1202, Stealth is automatically enabled at startup and cannot be disabled through the applet. In addition, SRA is enabled automatically after Stealth authorization (using a remote office authentication service 1206) has completed and cannot be disabled through the applet. If the endpoint is a server, default credentials must be provided and they cannot be overridden. In addition, in the event of log off by a user, a remote office authorized endpoint 1102 that is a server ensures that Stealth communications are not interrupted and continue using the Stealth COIs obtained during authorization.

Figure 13:
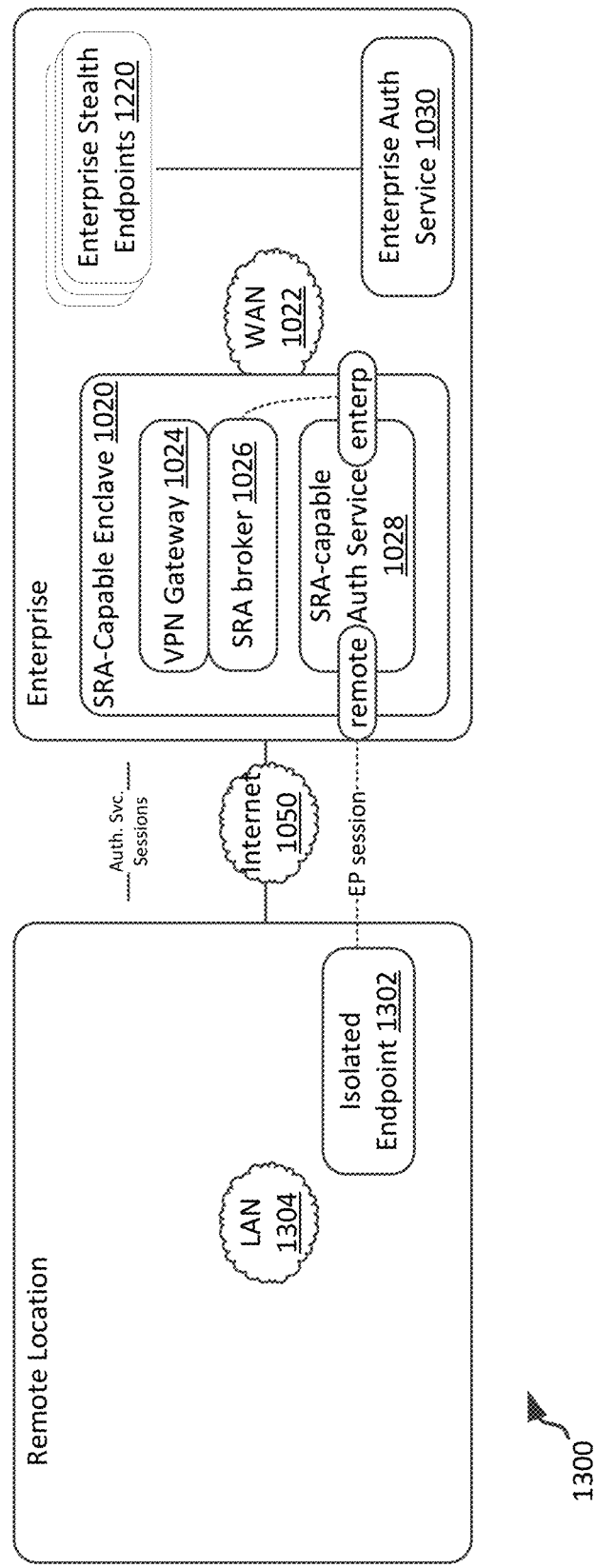
FIG. 13 illustrates an secure remote access-capable endpoint architecture, according to an example embodiment.

FIG. 13 illustrates a secure remote access-capable endpoint architecture, according to an example embodiment for an isolated endpoint topology 1300. In this arrangement, an isolated endpoint 1302 has a single secure remote access connection through which all traffic is "back-hauled". The endpoint may be within an enterprise (e.g. Windows XP/2003), or external to the enterprise (e.g. ATMs, ticketing kiosks, PoS devices, etc.).

On isolated endpoint 1302, Stealth must be enabled at startup even though all Stealth communications are through the secure remote access connection only. Accordingly, default credentials must be provided and they cannot be overridden. An isolated endpoint 1302 is authorized with no clear-text access to other devices available on the LAN 1304, and no local Stealth communications protocol usage capability.

Figure 14:
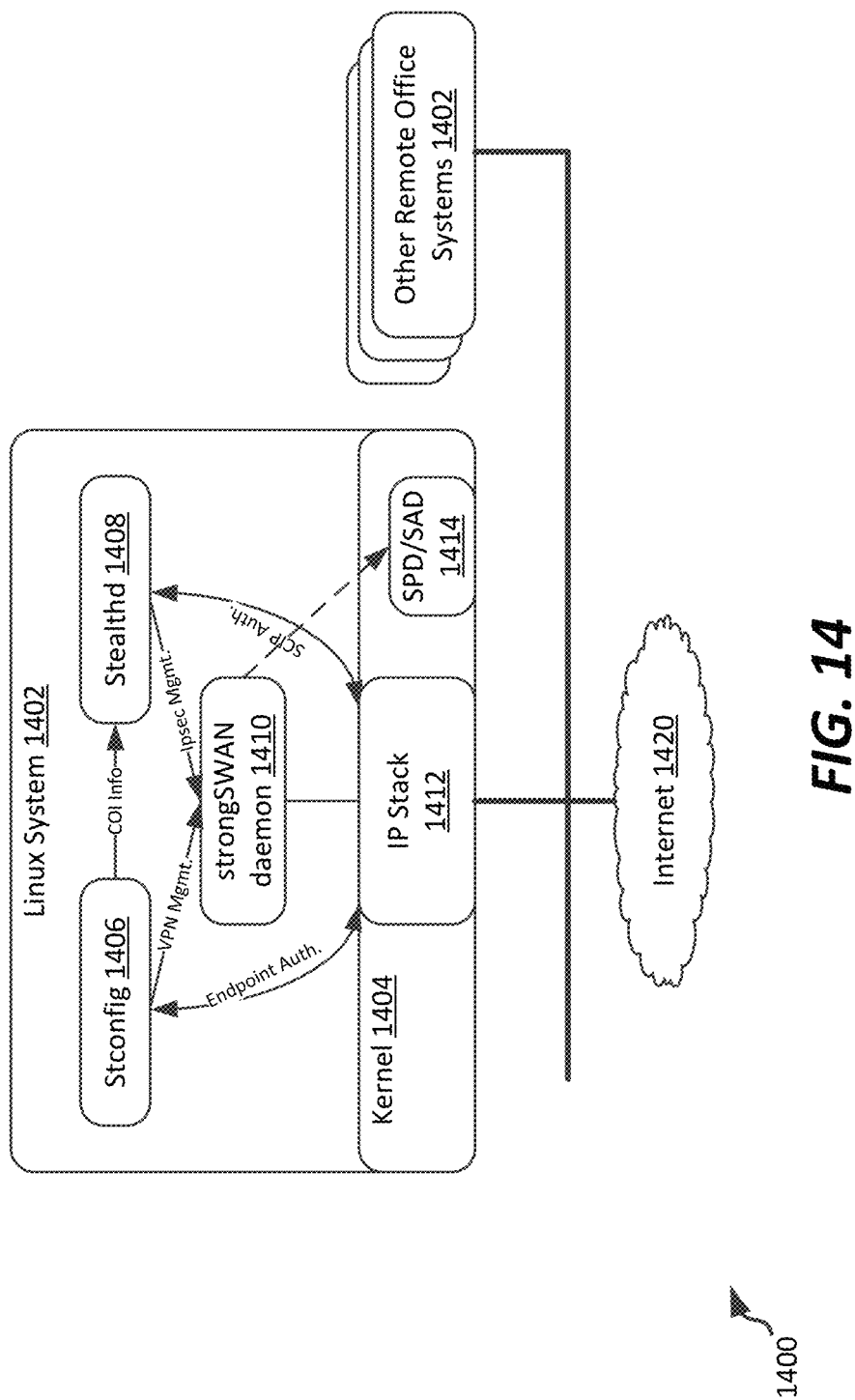
FIG. 14 illustrates an example remote endpoint block diagram useable in a remote endpoint, according to an example embodiment.
Figure 15:
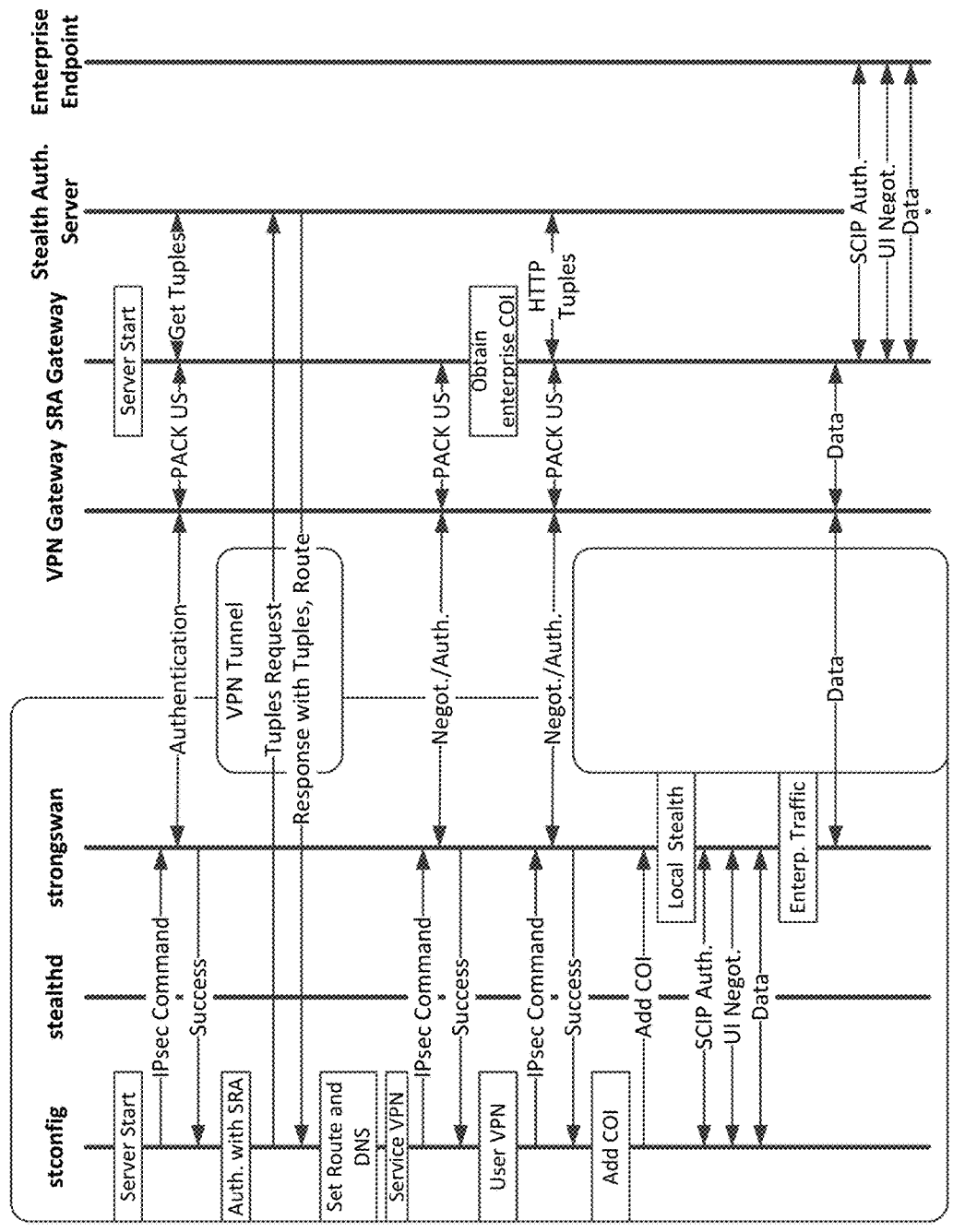
FIG. 15 illustrates a connection sequence for connecting a remote office server to an enterprise via a secure remote access gateway device, according to an example embodiment.
Figure 16:
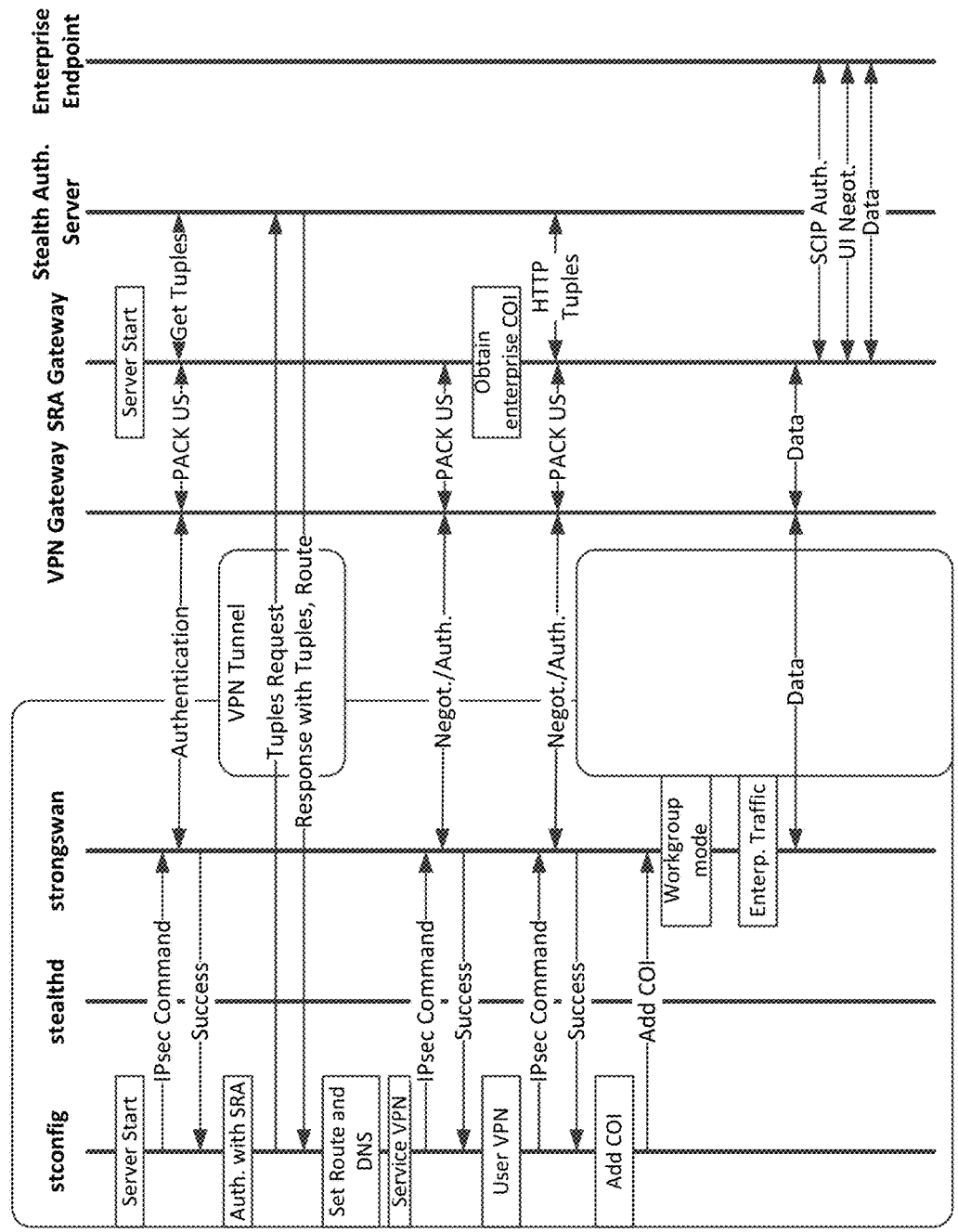
FIG. 16 illustrates a connection sequence for connecting an isolated endpoint to an enterprise via a secure remote access gateway device, according to an example embodiment.

Referring now to FIGS. 14-16, specific details regarding a Linux-based installation of a remote endpoint are provided. The example provided below represents a specific implementation of an endpoint and associated connection sequence useable to accomplish secure remote access, according to example embodiments.

Referring to FIG. 14, a block diagram of an example remote endpoint arrangement 1400 is shown, according to an example embodiment. The remote endpoint arrangement 1400 includes one or more remote endpoints 1402 connected to the Internet 1420. In at least one such remote endpoint, a Linux installation is provided, having a kernel 1404. The remote endpoint 1402 includes stconfig endpoint authorization software 1406, stealthd endpoint daemon software 1408, and strongSwan package 1410, the details of operation of which are discussed further below in connection with FIGS. 15-16. The kernel 1404 further includes an IP Stack and SPD/SAD 1414 that manage communications by the remote endpoint via the Internet 1420.

FIG. 15 illustrates a connection sequence for connecting a remote office server to an enterprise via a secure remote access gateway device, according to an example embodiment. In this arrangement, the remote office server may be a Linux-based remote server configured as a remote office device, having an installation analogous to that described above in connection with FIG. 14. In this arrangement, the stconfig endpoint authorization software 1406 manages establishment and termination of IPsec VPN connections with an enterprise. The stealthd endpoint daemon software 1408 provides Stealth endpoint facilities (i.e. establishment of Stealth tunnels with remote office endpoints, Stealth filtering) within a remote office. The strongSwan package 1410 provides IPsec VPN client facilities, used to establish and manage IPsec VPN connection with the Stealth secure remote access VPN gateway.

FIG. 16 illustrates a connection sequence 1600 for connecting an isolated endpoint to an enterprise via a secure remote access gateway device, according to an example embodiment. In this arrangement, the isolated endpoint may be a Linux-based remote server configured as an isolated endpoint, having an installation analogous to that described above in connection with FIG. 14. In this arrangement, the stconfig endpoint authorization software 1406 manages establishment and termination of IPsec VPN connections with an enterprise. The stealthd endpoint daemon software 1408 provides any endpoint filtering required to enforce (ensure) that all network traffic flows thru the enterprise via the VPN connection. Furthermore, the strongSwan package 1410 provides IPsec VPN client facilities, used to establish and manage IPsec VPN connection with the Stealth secure remote access VPN gateway.

As noted in the comparison between FIGS. 15-16, in FIG. 15, the stconfig may require SCIP authentication to allow for Stealth-based communications from the remote server endpoint within the remote office, while in FIG. 16 such local Stealth-based communication is disallowed. Otherwise, in both instances a connection and communication sequence is generally analogous to that described above in connection with FIGS. 5-7.

Figure 17:
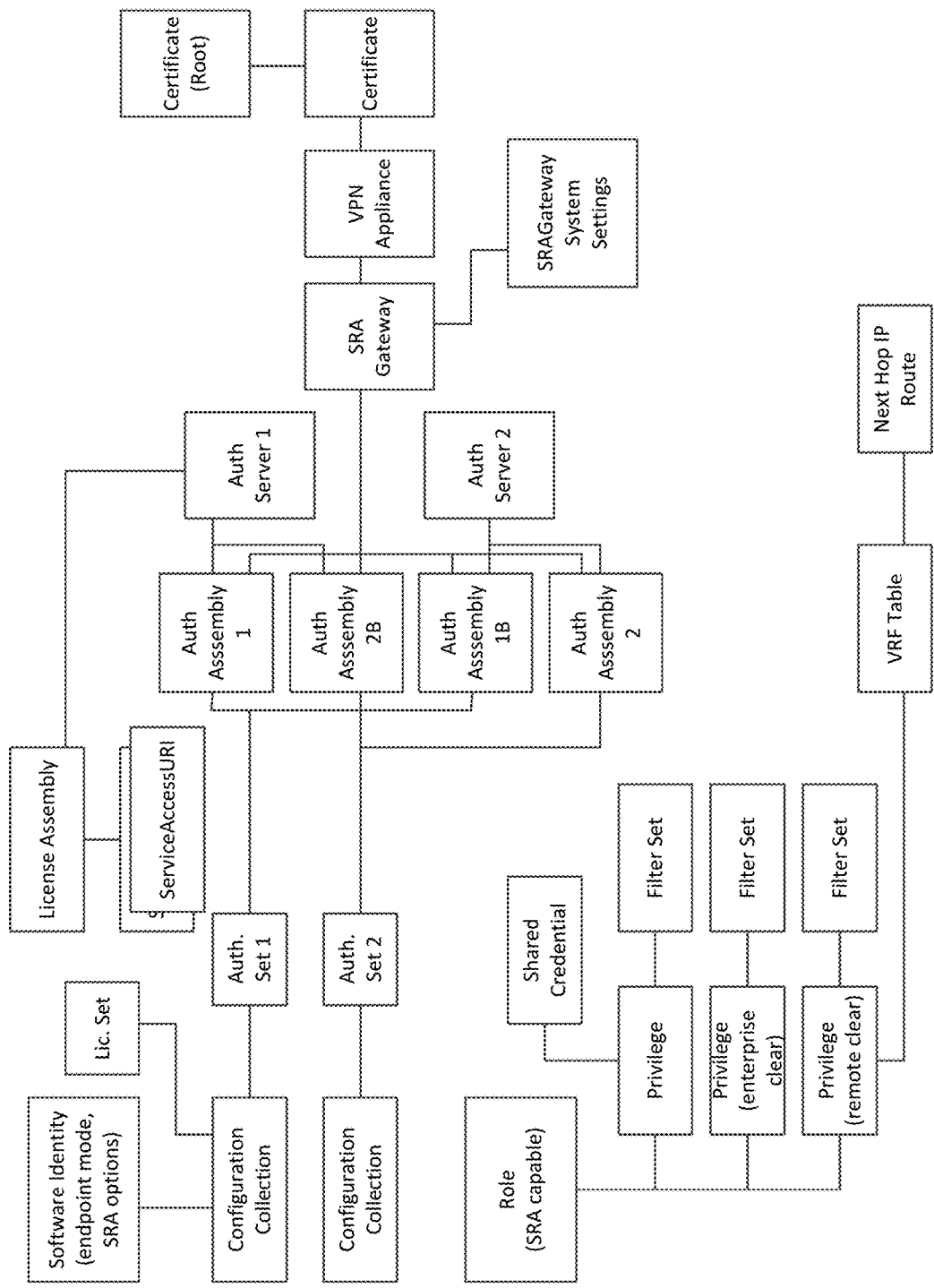
FIG. 17 illustrates an example object model useable in an enterprise to model a secured network including a plurality of authorization servers, for example including a dedicated remote authentication server.

FIG. 17 illustrates an example object model 1700 useable in an enterprise to model a secured network including a plurality of authorization servers, for example including a dedicated remote authentication server. The object model 1700 can be stored in an enterprise management server, such as server 402 of FIG. 4, above. The object model 1700 provides an interrelationship among the various roles, authorization servers, the secure remote access gateway, VPN appliance, and certificates used for connection, as well as the filters and privileges associated with various roles within an enterprise. Additional details regarding example features of an object model such as object model 1700 are provided in U.S. patent application Ser. No. 14/688,348, filed on Apr. 4, 2015 entitled "ENTERPRISE MANAGEMENT FOR SECURE NETWORK COMMUNICATIONS OVER IPSEC", the disclosure of which was previously incorporated by reference in its entirety.

Referring to FIGS. 1-17 overall, it is noted that in addition to the above functionality, it is apparent that specific applications may be made available using the methods and systems discussed herein for providing remote connectivity to a Stealth-enabled network. For example, application-level connectivity and security can be provided, allowing for different access by different applications to different endpoints within different communities of interest, with dedicated VDRs for each community of interest and/or application connection made. Furthermore, based on the flexibility of communication connections of such remote devices, different roles can be assigned to different devices, each having different secured connectivity requirements and timing requirements for accomplishing such secured connectivity. Additionally, VDRs can be dynamically allocated, either at a particular secure remote access gateway or within a high availability environment including redundant and fault-tolerant networks of such gateways. Additionally, remote devices can be managed to allow for mixed use (secure and unsecured communications) using various filter lists and multiple communities of interest per remote computing device to manage such communication. Other advantages are provided as well, as are apparent from the above disclosure.

The above specification, examples and data provide a complete description of the manufacture and use of the composition of the invention. Since many embodiments of the invention can be made without departing from the spirit and scope of the invention, the invention resides in the claims hereinafter appended.

The investment claimed is:

1. A computer-implemented method of securing communications with an enterprise, the method comprising:
   initiating a first secured connection between a remote computing device and a VPN appliance associated with an enterprise using service credentials maintained in a secure applet installed on the remote computing device;
   initiating communication with the authentication server within an enterprise via the first secured connection;
   providing user credentials from the secure applet to the authentication server;
   receiving specific credentials from the authentication server based on the user credentials, the specific credentials providing access to one or more computing devices within the enterprise that are within a community of interest accessible by the user, the community of interest including the one or more computing devices and the remote computing device, and obfuscating to the user and the remote computing device one or more other computing systems within the enterprise excluded from the community of interest;
   terminating the first secured connection with the VPN appliance;
   after terminating the first secured connection, initiating a second secured connection between the remote computing device and the VPN appliance using the specific credentials from the authentication server, the specific credentials including a one-time password used for establishing the second secured connection;
   wherein the second secured connection enables communication between the remote computing device and the one or more computing devices within the community of interest via a virtual data relay (vDR) that manages access to the community of interest on behalf of the remote computing device.

2. The computer-implemented method of claim 1, further comprising transmitting a session termination message to the authentication server.

3. The computer-implemented method of claim 2, further comprising, after transmitting the session termination message, terminating the second secured connection.

4. The computer-implemented method of claim 1, wherein the community of interest is associated with user credentials received at a secured application installed on the remote computing device.

5. The computer-implemented method of claim 1, wherein the specific credentials include a username and password of a user of the remote computing device.

6. The computer-implemented method of claim 1, wherein the specific credentials are different from the service credentials.

7. A computer-implemented method of securing communications between a remote computing device and an enterprise, the method comprising:
   receiving a request for a secured connection from a remote device at a secure remote access gateway device using a set of service credentials maintained at the remote device;
   starting a service virtual data relay useable by the remote device to communicate with an authentication server within the enterprise;
   accepting the request for the secured connection at the secure remote access gateway device, thereby establishing a VPN connection between a VPN appliance associated with the secure remote access gateway device and the remote device;
   receiving user credentials from the remote device;
   providing user credentials to the authentication server within the enterprise;
   receiving specific credentials from the authentication server based on the user credentials, the specific credentials providing access to one or more computing devices within the enterprise that are within a community of interest accessible by the user, the community of interest including the one or more computing devices and the remote computing device, and obfuscating to the user and the remote computing device one or more other computing systems within the enterprise excluded from the community of interest;
   providing the specific credentials to the remote device;
   receiving a request from the remote device to terminate the secured connection;
   terminating the service virtual data relay;
   after terminating the service virtual data relay, receiving a request from the remote device to initiate a second secured connection from the remote device at the secure remote access gateway device using the specific credentials;
   starting a device-specific virtual data relay useable by the remote computing device to communicate with the one or more computing systems within the enterprise, the device-specific virtual data relay being provided with a community of interest key associated with the community of interest by the authentication server; and
   accepting the request for the second secured connection, thereby allowing the remote computing device to initiate communications with at least one of the one or more computing devices included in the community of interest without requiring communication of the community of interest key to the remote device.

8. The computer-implemented method of claim 7, further comprising receiving a request to terminate the second secured connection from the remote computing device.

9. The computer-implemented method of claim 8, further comprising, in response to the request to terminate the second secured connection, terminating the device-specific virtual data relay.

10. The computer-implemented method of claim 8, further comprising maintaining service credentials associated with a service community of interest.

11. A system enabling secured communications with an enterprise, the system comprising:
   a secure remote access gateway device operable as an intermediary between a remote device and one or more computing devices within an enterprise, the secure remote access gateway device configured to execute program instructions to:
   receive a request for a secured connection from a remote device using a set of service credentials maintained at the remote device;
   start a service virtual data relay useable by the remote device to communicate with an authentication server within the enterprise;
   accept the request for the secured connection at the secure remote access gateway device, thereby establishing a VPN connection between a VPN appliance associated with the secure remote access gateway device and the remote device;
   receive user credentials from the remote device;
   provide user credentials to the authentication server within the enterprise;
   receive specific credentials from the authentication server based on the user credentials, the specific credentials providing access to one or more computing devices within the enterprise that are within a community of interest accessible by the user, the community of interest including the one or more computing devices and the remote computing device, and obfuscating to the user and the remote computing device one or more other computing systems within the enterprise excluded from the community of interest;

provide the specific credentials to the remote device;

receive a request from the remote device to terminate the secured connection;

terminate the service virtual data relay;

after terminating the service virtual data relay, receive a request from the remote device to initiate a second secured connection from the remote device at the secure remote access gateway device using the specific credentials;

start a device-specific virtual data relay useable by the remote computing device to communicate with the one or more computing systems within the enterprise, the device-specific virtual data relay being provided with a community of interest key associated with the community of interest by the authentication server; and accept the request for the second secured connection, thereby allowing the remote computing device to initiate communications with at least one of the one or more computing devices included in the community of interest without requiring communication of the community of interest key to the remote device.

12. The system of claim 11, wherein the secure remote access gateway device is communicatively connected to the remote device.

13. The system of claim 12, further comprising a remote device communicatively connected to the secure remote access gateway device.

14. The system of claim 13, further comprising an authorization server maintained within the enterprise.

15. The system of claim 14, further comprising one or more servers maintained within the enterprise, the one or more servers included within a common community of interest with the remote device and communicatively accessible by the remote device via the secure remote access gateway device.

16. The system of claim 11, wherein the remote computing device includes at least partially non-trusted content received from external to the enterprise.

17. The system of claim 11, wherein the remote computing device includes an applet configured to manage secure communications with the secure remote access gateway device.

18. The system of claim 11, wherein the remote computing device is a member of a second community of interest different from the community of interest, the second community of interest including devices external to the enterprise.

19. The system of claim 12, wherein the remote computing device is assigned an endpoint mode selected from among a collection of endpoint modes consisting of:

an enterprise workstation mode;

an enterprise server mode;

a roaming workstation mode;

a remote office workstation mode;

a remote office server mode; and an isolated endpoint mode.

20. The system of claim 12, wherein the remote computing device is assigned one or more filters, each filter of the one or more filters defining a list of computing devices with which the remote computing device is authorized to communicate.

21. The system of claim 12, wherein communication between the remote computing device and the one or more computing devices within the enterprise is routed through the device-specific virtual data relay.

22. The computer-implemented method of claim 1, wherein the one or more computing devices within the enterprise being within a same community of interest as the remote computing device are accessible using the second secured connection between the remote computing device and the VPN appliance, and the one or more computing devices within the enterprise are inaccessible using the first secured connection between the remote computing device and the VPN.

* * * * *